US010896256B1

(12) United States Patent
Saxe et al.

(10) Patent No.: US 10,896,256 B1
(45) Date of Patent: *Jan. 19, 2021

(54) METHODS AND APPARATUS FOR MACHINE LEARNING BASED MALWARE DETECTION

(71) Applicant: Invincea, Inc., Reston, VA (US)

(72) Inventors: Joshua Daniel Saxe, Los Angeles, CA (US); Konstantin Berlin, Potomac, MD (US)

(73) Assignee: Invincea, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,471

(22) Filed: May 17, 2019

Related U.S. Application Data

(63) Continuation of application No. 15/877,676, filed on Jan. 23, 2018, now Pat. No. 10,303,875, which is a continuation of application No. 15/616,391, filed on Jun. 7, 2017, now Pat. No. 9,910,986, which is a continuation of application No. 15/228,728, filed on Aug. 4, 2016, now Pat. No. 9,690,938.

(60) Provisional application No. 62/201,263, filed on Aug. 5, 2015.

(51) Int. Cl.
| | |
|---|---|
| *G06F 12/16* | (2006.01) |
| *G06F 21/56* | (2013.01) |
| *G06N 3/04* | (2006.01) |
| *G06N 7/00* | (2006.01) |
| *G06N 20/00* | (2019.01) |

(52) U.S. Cl.
CPC ............. *G06F 21/563* (2013.01); *G06N 3/04* (2013.01); *G06N 7/005* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,226,629 | B1 | 5/2001 | Cossock |
| 8,001,583 | B2 | 8/2011 | Waizumi et al. |
| 8,028,338 | B1 | 9/2011 | Schneider et al. |

(Continued)

FOREIGN PATENT DOCUMENTS

| | | |
|---|---|---|
| EP | 3018879 | 5/2015 |
| WO | WO 2017/011702 A1 | 1/2017 |
| WO | WO 2017/223294 | 12/2017 |

OTHER PUBLICATIONS

Office Action for U.S. Appl. No. 14/212,659, dated Jul. 22, 2016, 27 pages.

(Continued)

*Primary Examiner* — Brandon S Hoffman
(74) *Attorney, Agent, or Firm* — Cooley LLP

(57) ABSTRACT

Apparatus and methods describe herein, for example, a process that can include receiving a potentially malicious file, and dividing the potentially malicious file into a set of byte windows. The process can include calculating at least one attribute associated with each byte window from the set of byte windows for the potentially malicious file. In such an instance, the at least one attribute is not dependent on an order of bytes in the potentially malicious file. The process can further include identifying a probability that the potentially malicious file is malicious, based at least in part on the at least one attribute and a trained threat model.

21 Claims, 10 Drawing Sheets

(56) References Cited

U.S. PATENT DOCUMENTS

| | | | |
|---|---|---|---|
| 8,095,981 | B2 | 1/2012 | Rabinovitch et al. |
| 8,291,497 | B1 | 10/2012 | Griffin et al. |
| 8,413,244 | B1 | 4/2013 | Nachenberg et al. |
| 8,505,094 | B1 | 8/2013 | Xuewen et al. |
| 8,521,667 | B2 | 8/2013 | Zhu et al. |
| 9,015,814 | B1 | 4/2015 | Zakorzhevsky et al. |
| 9,672,358 | B1 | 6/2017 | Long et al. |
| 9,690,938 | B1 | 6/2017 | Saxe et al. |
| 9,705,904 | B1 | 7/2017 | Davis et al. |
| 9,910,986 | B1 | 3/2018 | Saxe et al. |
| 9,940,459 | B1 | 4/2018 | Saxe |
| 10,104,100 | B1 | 10/2018 | Bogorad |
| 10,303,875 | B1 | 5/2019 | Saxe et al. |
| 10,318,735 | B2 | 6/2019 | Saxe |
| 10,474,818 | B1 | 11/2019 | Saxe |
| 10,649,970 | B1 | 5/2020 | Saxe et al. |
| 2005/0050335 | A1 | 3/2005 | Liang et al. |
| 2005/0166046 | A1 | 7/2005 | Bellovin et al. |
| 2005/0187740 | A1 | 8/2005 | Marinescu |
| 2005/0223238 | A1* | 10/2005 | Schmid .......... H04L 9/0625 713/188 |
| 2006/0015630 | A1 | 1/2006 | Stolfo |
| 2008/0127336 | A1 | 5/2008 | Sun |
| 2008/0140662 | A1 | 6/2008 | Pandya |
| 2008/0140751 | A1 | 6/2008 | Ide et al. |
| 2009/0044024 | A1 | 2/2009 | Oberheide et al. |
| 2009/0100055 | A1 | 4/2009 | Wang |
| 2009/0172815 | A1 | 7/2009 | Gu |
| 2009/0293125 | A1 | 11/2009 | Szor |
| 2010/0115620 | A1 | 5/2010 | Alme |
| 2011/0154495 | A1 | 6/2011 | Stranne |
| 2011/0179484 | A1 | 7/2011 | Tuvell |
| 2011/0214161 | A1 | 9/2011 | Stolfo et al. |
| 2012/0158626 | A1 | 6/2012 | Zhu et al. |
| 2012/0159620 | A1 | 6/2012 | Seifert et al. |
| 2012/0210423 | A1 | 8/2012 | Friedrichs et al. |
| 2012/0233127 | A1 | 9/2012 | Solmer et al. |
| 2012/0233693 | A1 | 9/2012 | Stites et al. |
| 2013/0167236 | A1 | 6/2013 | Sick |
| 2013/0276114 | A1 | 10/2013 | Friedrichs et al. |
| 2014/0090061 | A1* | 3/2014 | Avasarala .......... G06F 21/56 726/24 |
| 2014/0298460 | A1 | 10/2014 | Xue et al. |
| 2015/0242626 | A1 | 8/2015 | Wang et al. |
| 2015/0302268 | A1 | 10/2015 | Collet et al. |
| 2015/0312189 | A1 | 10/2015 | Lee |
| 2015/0379427 | A1 | 12/2015 | Dirac et al. |
| 2016/0014149 | A1 | 1/2016 | Bradley et al. |
| 2016/0156460 | A1 | 6/2016 | Feng et al. |
| 2016/0239706 | A1 | 8/2016 | Dijkman et al. |
| 2017/0017795 | A1 | 1/2017 | DiGiambattista |
| 2017/0085585 | A1 | 3/2017 | Morkovský |
| 2017/0134404 | A1 | 5/2017 | Machlica et al. |
| 2017/0228641 | A1 | 8/2017 | Sohn |
| 2017/0328194 | A1 | 11/2017 | Liu et al. |
| 2017/0372071 | A1 | 12/2017 | Saxe |
| 2018/0041536 | A1 | 2/2018 | Berlin |
| 2018/0285740 | A1 | 10/2018 | Smyth et al. |
| 2019/0278909 | A1 | 9/2019 | Saxe |
| 2019/0364063 | A1 | 11/2019 | Lee et al. |

OTHER PUBLICATIONS

Office Action for U.S. Appl. No. 14/212,659, dated May 19, 2017, 29 pages.

Office Action for U.S. Appl. No. 14/212,659, dated Nov. 13, 2017, 31 pages.

Office Action for U.S. Appl. No. 14/716,290, dated Aug. 4, 2016, 15 pages.

Office Action for U.S. Appl. No. 14/716,290, dated Jun. 1, 2017, 14 pages.

Office Action for U.S. Appl. No. 15/228,728, dated Oct. 21, 2016, 9 pages.

Office Action for U.S. Appl. No. 15/616,391, dated Sep. 22, 2017, 6 pages.

Office Action for U.S. Appl. No. 14/212,659, dated Aug. 3, 2018, 32 pages.

Office Action for U.S. Appl. No. 15/877,676, dated Sep. 14, 2018, 6 pages.

Notice of Allowance for U.S. Appl. No. 15/877,676, dated Jan. 18, 2019, 5 pages.

Office Action for U.S. Appl. No. 14/212,659, dated May 16, 2019, 36 pages.

International Search Report and Written Opinion for International Application No. PCT/US2017/038715, dated Sep. 6, 2017, 8 pages.

Search Report for UK Patent Application No. GB 1712454.6, dated Jan. 15, 2018, 4 pages.

Avira Virus Lab, Natural language descriptor sample page, [Online], Retrieved from the Internet: <https://web.archive.org/web/20101006002848/https://www.avira.com/en/support-virus-lab>, Retrieved on Oct. 30, 2017, 2 pages.

Berlin, K. et al., "Malicious Behavior Detection using Windows Audit Logs," Proceedings of the 8th ACM Workshop on Artificial Intelligence and Security, Oct. 16, 2015, pp. 35-44.

Bulut, I. et al., "Mobile malware detection using deep neural network," Signal Processing and Communications Applications Conference (SIU), May 15-18, 2017 (with English Abstract).

Dahl, et al., "Large-scale malware classification using random projections and neural networks." International Workshop on Acoustic Signal Enhancement 2012, Institute of Electrical and Electronics Engineers (2013); 3422-3426.

Doersch, C., "Tutorial on Variational Autoencoders," arXiv:1606.05908v2 [stat.ML], Aug. 16, 2016, 23 pages.

Extended European Search Report for European Application No. 17816199.8 dated Apr. 9, 2019, 8 pages.

Gilbert, "Convolutional Neural Networks for Malware Classification", Oct. 20, 2016, A thesis presented for the degree of Master in Artificial Intelligence, pp. 1-100.

Griffin, K. et al., "Automatic Generation of String Signatures for Malware Detection," International Workshop on Recent Advances in Intrusion Detection, Springer Berlin Heidelberg, 2009, 29 pages.

Kolosnjaji, et al, "Empowering Convolutional Networks for Malware Classification and Analysis", no date provided, Technical University of Munich, pp. 1-8.

Kolter, J. Z. et al., "Learning to Detect and Classify Malicious Executables in the Wild," Journal of Machine Learning Research, vol. 7, 2006, pp. 2721-2744. Based on an earlier work: Learning to Detect Malicious Executables in the Wild, in Proceedings of the Tenth ACM SIGKDD International Conference on Knowledge Discovery and Data Mining, ACM, 2004. http://doi.acm.org/10.1145/1014052.1014105.

Kong, D. et al., "Discriminant malware distance learning on structural information for automated malware classification," Proceedings of the 19th ACM SIGKDD International Conference on Knowledge Discovery and Data Mining, KDD'13, Aug. 11-14, 2013, Chicago, Illinois, pp. 1357-1365.

Morris, R., "Counting large numbers of events in small registers," Communications of the ACM, vol. 21, No. 10, Oct. 1978, pp. 840-842.

ThreatExpert—Automated Threat Analysis, Geographic Distribution of Threats, [Online], Jan. 15, 2013, Retrieved from the Internet: <URL: http://web.archive.org/web/20130115040419/http://threatexpert.com/>, Retrieved on Jan. 20, 2017, 2 pages.

Sathyanarayan, V. S. et al., "Signature Generation and Detection of Malware Families," Proceedings of the 13th Australasian Conference on Information Security and Privacy, ACISP 2008, LNCS 5107, Yi Mu et al. (eds.). Springer-Verlag, Heidelberg, pp. 336-349 (2008).

Saxe, J. et al., "Deep Neural Network Based Malware Detection Using Two Dimensional Binary Program Features," arXiv:1508.03096v2, Sep. 3, 2015, 10 pages.

Saxe and Berlin, "Deep Neural Network Based Malware Detection Using Two Dimensional Binary Program Features," IEEE 2015,10th International Conference on Malicious and Unwanted Software: "Know Your Enemy" (Malware), 2015, pp. 11-20.

(56) References Cited

OTHER PUBLICATIONS

Saxe, J. et al., "Visualization of Shared System Call Sequence Relationships in Large Malware Corpora," Proceedings of the ninth international symposium on visualization for cyber security, VizSec '12, Oct. 15, 2012, Seattle, WA, 8 pages.

Saxe, J. et al., "CrowdSource: Automated Inference of High Level Malware Functionality from Low-Level Symbols Using a Crowd Trained Machine Learning Model," IEEE, 9th International Conference, Oct. 28, 2014, pp. 68-75.

Saxe, J. "Why Security Data Science Matters and How its Different: Pitfalls and Promises of Data Science Based Breach Detection and Threat Intelligence," BlackHat USA 2015, Briefings Aug. 1-6, 2016 [Online], Retrieved from the Internet: <URL: https://www.blackhat.com/us-15/briefings.html>, Retrieved on Jan. 20, 2017, 1 pages.

Saxe, J. Presentation: "Why Security Data Science Matters and How its Different: Pitfalls and Promises of Data Science Based Breach Detection and Threat Intelligence," Invincea, 2015, 103 pages.

Saxe, J. et al., "eXpose: A Character-Level Convolutional Neural Network with Embeddings for Detecting Malicious URLs, File Paths and Registry Keys," arXiv:1702.08568v1 (Feb. 27, 2017), 18 pages.

Schroff, F. et al., "FaceNet: A Unified Embedding for Face Recognition and Clustering," Computer Vision Foundation, 2015 [online], Retrieved from the Internet: <URL: https://www.cv-foundation.org/openaccess/content_cvpr_2015/papers/Schroff_FaceNet_A_Unified_2015_CVPR_paper.pdf>, pp. 815-823.

Van Durme, B. et al., "Probabilistic counting with randomized storage," In Proceedings of the 21st International Joint Conference on Artificial Intelligence (IJCAI'09), Hiroaki Kitano (ed.). (2009), Morgan Kaufmann Publishers Inc., San Francisco, CA, USA, 1574-1579.

Wang, Y., et al., "A deep learning approach for detecting malicious JavaScript code." Security and Communications Networks (2016); 9(11): 1520-1534.

Office Action for U.S. Appl. No. 15/666,859, dated Oct. 21, 2019, 25 pages.

Office Action for U.S. Appl. No. 15/666,859, dated Apr. 29, 2020, 30 pages.

Office Action for U.S. Appl. No. 16/425,115, dated May 29, 2020, 10 pages.

Luo, et al., "Deep Learning With Noise". Retrieved Oct. 15, 2019 from https://pdfs.semanticscholar.org/d79b/a428e1cf1b8aa5d320a93166315bb30b4765.pdf, 9 pages (indicated by the Examiner in U.S. Appl. No. 15/666,859 as being published in 2014).

Patterson (Semantic Hashing with Variational Autoencoders, retrieved Apr. 24, 2020 from https://pdfs.semanticscholar.org/f2c3/3951f347b5e0f7ac4946f0672fdb4ca5394b.pdf) (Year: 2016), 11 pages.

* cited by examiner

METHODS AND APPARATUS FOR MACHINE LEARNING BASED MALWARE DETECTION

CROSS-REFERENCE TO RELATED APPLICATIONS

This application is a continuation application of U.S. patent application Ser. No. 15/877,676, filed Jan. 23, 2018, now U.S. Pat. No. 10,303,875, and entitled "METHODS AND APPARATUS FOR MACHINE LEARNING BASED MALWARE DETECTION," which is a continuation application of U.S. patent application Ser. No. 15/616,391, filed Jun. 7, 2017, now U.S. Pat. No. 9,910,986, and entitled "METHODS AND APPARATUS FOR MACHINE LEARNING BASED MALWARE DETECTION," which is a continuation application of U.S. patent application Ser. No. 15/228,728, filed Aug. 4, 2016, now U.S. Pat. No. 9,690,938, and entitled "METHODS AND APPARATUS FOR MACHINE LEARNING BASED MALWARE DETECTION," which claims priority to and the benefit of U.S. Provisional Application Ser. No. 62/201,263, filed Aug. 5, 2015, and entitled "METHODS AND APPARATUS FOR MACHINE LEARNING BASED MALWARE DETECTION," the disclosure of each of which is incorporated herein by reference in its entirety.

BACKGROUND

Malware detection systems can be configured to detect the presence of malware on compute devices. Some known malware detection systems collect a number of malware samples, and can compare each malware sample to a potential malware file sample, to determine whether the potential malware file sample matches a known malware sample. Such a process can be time-consuming and resource-intensive, and can require frequent updates to a known malware database to determine whether a file on a system is malware.

Other known systems can employ a list of rules or heuristics to determine whether to classify a file as malware. Such known systems typically rely on prior knowledge of a file's type to determine whether malicious code has been injected into a particular file. Such methods, however, can result in a large number of false positives, as a user's natural modification of a file (e.g., a user adding data to a text document) can change the placement and/or order of bytes in a file, causing the system to falsely detect that the file has been maliciously changed. Additionally, such known methods use knowledge of an expected arrangement of bytes in a file of a large number of file types, which can require a large number of resources to maintain.

Accordingly, a need exists for methods and apparatus that can use machine learning techniques to reduce the amount of time used to determine the identity of a malware threat.

SUMMARY

In some embodiments, a malware detection device (e.g., a client device and/or a malware detection server) can generate a threat model for determining a malware threat score by, for example, training the threat model based on an informational entropy and/or other features and/or characteristics of each file. The malware detection device can then determine whether a potential malware file is a threat or not by applying the threat model to the informational entropy and/or other features and/or characteristics of the potential malware file. By using the informational entropy and/or other features and/or characteristics of the file, the malware detection device can analyze the contents of a file without using and/or knowledge of the file's type, origin, and/or other such information.

For example, in some implementations, a malware detection device including a memory and a processor configured to implement an analysis module and a threat analyzer module, can, via the analysis module, receive a potentially malicious file, and can calculate an attribute associated with the potentially malicious file. The attribute can be at least one of an indication of how often a combination of an informational entropy range and a byte value range occurs within the potentially malicious file, an indication of how often a combination of the informational entropy range and a byte standard deviation range occurs within the potentially malicious file, or an indication of how often a combination of a string length range and a string hash value range occurs within the potentially malicious file. The threat analyzer module can calculate a probability that the potentially malicious file is malicious based on the attribute value, and/or using a trained threat model.

In other implementations, an analysis module implemented in at least one of a memory or a processing device can receive a potentially malicious file and can define an indication of a degree of variance of byte values within each portion from a set of portions of the potentially malicious file. The analysis module can identify a number of occurrences of each byte value from a set of byte values within each portion from the set of portions. A threat analyzer module implemented in at least one of the memory or the processing device and operatively coupled to the analysis module, can calculate a probability that the potentially malicious file is malicious using the indication for each portion from the set of portions and the number of occurrences of the set of byte values for each portion from the set of portions.

In other implementations, a process for determining whether a file is malware can include receiving a potentially malicious file. The potentially malicious file can be divided into a set of byte windows. At least one attribute associated with each byte window from the set of byte windows for the potentially malicious file can be calculated, and the at least one attribute may not be dependent on an order of bytes in the potentially malicious file. A probability that the potentially malicious file is malicious can then be identified, based at least in part on the at least one attribute and a trained threat model.

DETAILED DESCRIPTION

In some implementations, methods and apparatuses disclosed herein can cluster (e.g., classify) malware samples to determine whether other input samples are malware files. For example, a malware detection device can use machine learning techniques to automatically and dynamically determine clusters with which to classify malware samples, and can determine which malware samples belong in each cluster. The malware detection device can cluster malware samples, security events, network streams, and/or malicious domain names, so that the malware detection device can later determine whether a threat has been detected on a network, e.g., based on determining whether future input samples, security events, and/or the like can be classified within an existing malware cluster.

In some implementations, clusters can include malware clusters (e.g., clusters of malware) and benignware clusters (e.g., clusters of files that are not malware). The machine learning processes used by the malware detection device can determine whether incoming input files can be classified in malware clusters or in benignware clusters using methods and apparatuses described below.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used herein, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

Figure 1:
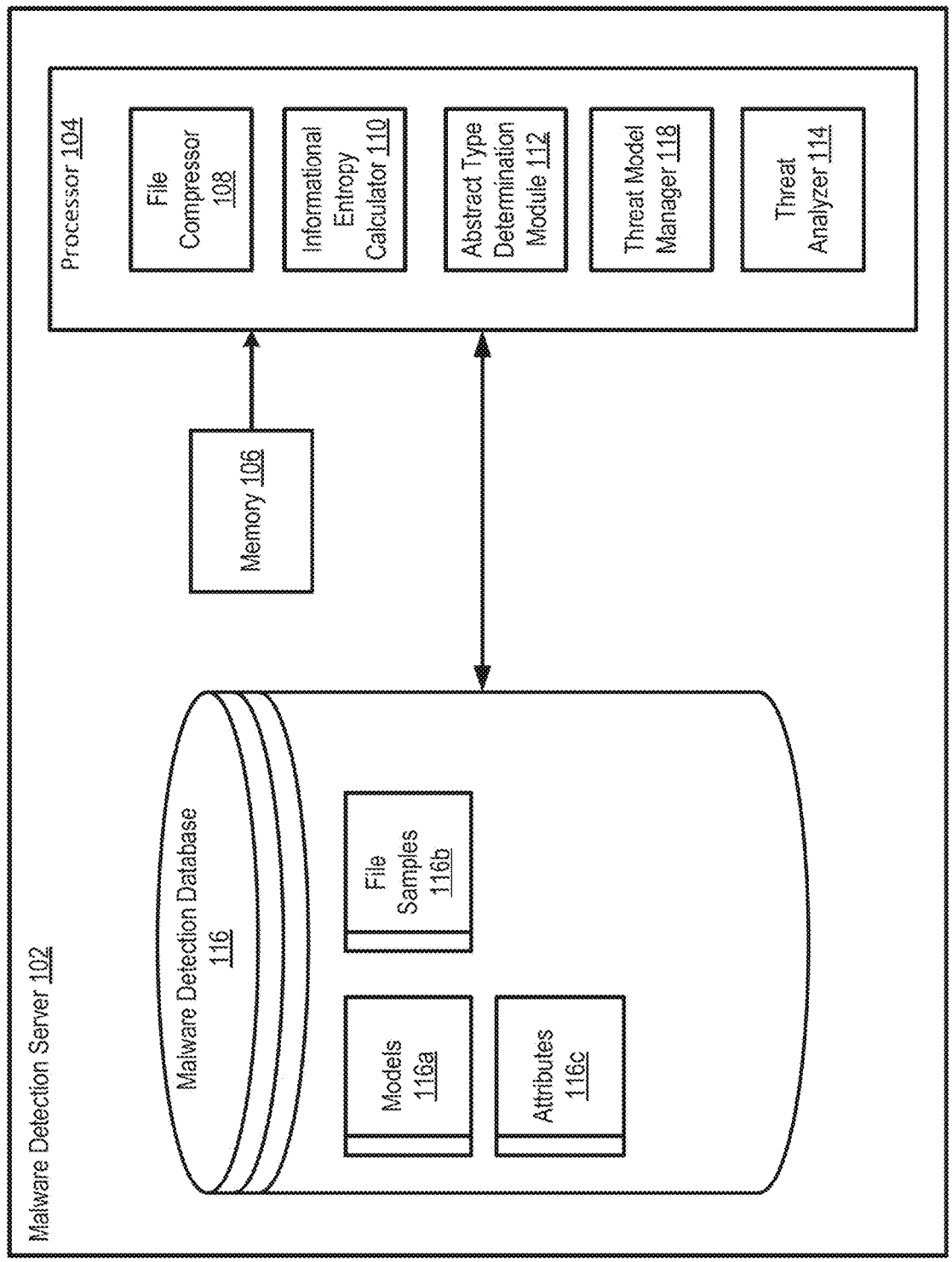
FIG. 1 is a schematic diagram illustrating a malware detection server, according to an embodiment.

FIG. 1 is a block diagram illustrating a malware detection server 102. For example, in some implementations, a malware detection server 102 can include at least one processor 104, at least one memory 106, and/or at least one malware detection database 116. The at least one processor 104 can be any hardware module and/or component configured to receive and process data, and/or to execute code representing executable instructions. In some embodiments, the at least one processor 104 can be a general purpose processor, a Field Programmable Gate Array (FPGA), an Application Specific Integrated Circuit (ASIC), a Digital Signal Processor (DSP), and/or the like.

The at least one memory 106 can be a hardware module and/or component configured to store data accessible by the at least one processor 104, and/or to store code representing executable instructions for the at least one processor 104. The memory 106 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 106 stores instructions to cause the processor to execute modules, processes and/or functions associated with a malware detection server 102 and/or system.

The at least one processor 104 can implement a number of modules and/or server components, including but not limited to a file compressor 108, an informational entropy calculator 110, an abstract type determination module 112, a threat model manager 118, and a threat analyzer 114. The at least one processor 104 can be configured to execute instructions generated by any of the modules and/or server components, and/or instructions stored in the memory 106. In some implementations, if the malware detection server 102 includes multiple processors 104, the modules and/or server components can be distributed among and/or executed by the multiple processors. The at least one memory 106 can be configured to store processor-readable instructions that are accessible and executable by the processor. In other implementations, the processor 104 does not include every module represented in FIG. 1. For example, in some instances, the processor 104 does not include a file compressor 108. In still other implementations, the processor 104 can include additional modules not represented in FIG. 1

In some implementations, the modules and/or server components can be implemented on the processor 104 (e.g., as software executed on and/or implemented by the processor). In some implementations, the modules and/or server components can be software stored in the memory 106 and executed by the processor 104. In other implementations, the modules and/or server components can be any assembly and/or set of operatively-coupled electrical components separate from the processor 104 and the memory, including but not limited to field programmable gate arrays (FPGAs) and/or application-specific integrated circuits (ASICs).

Figure 8:
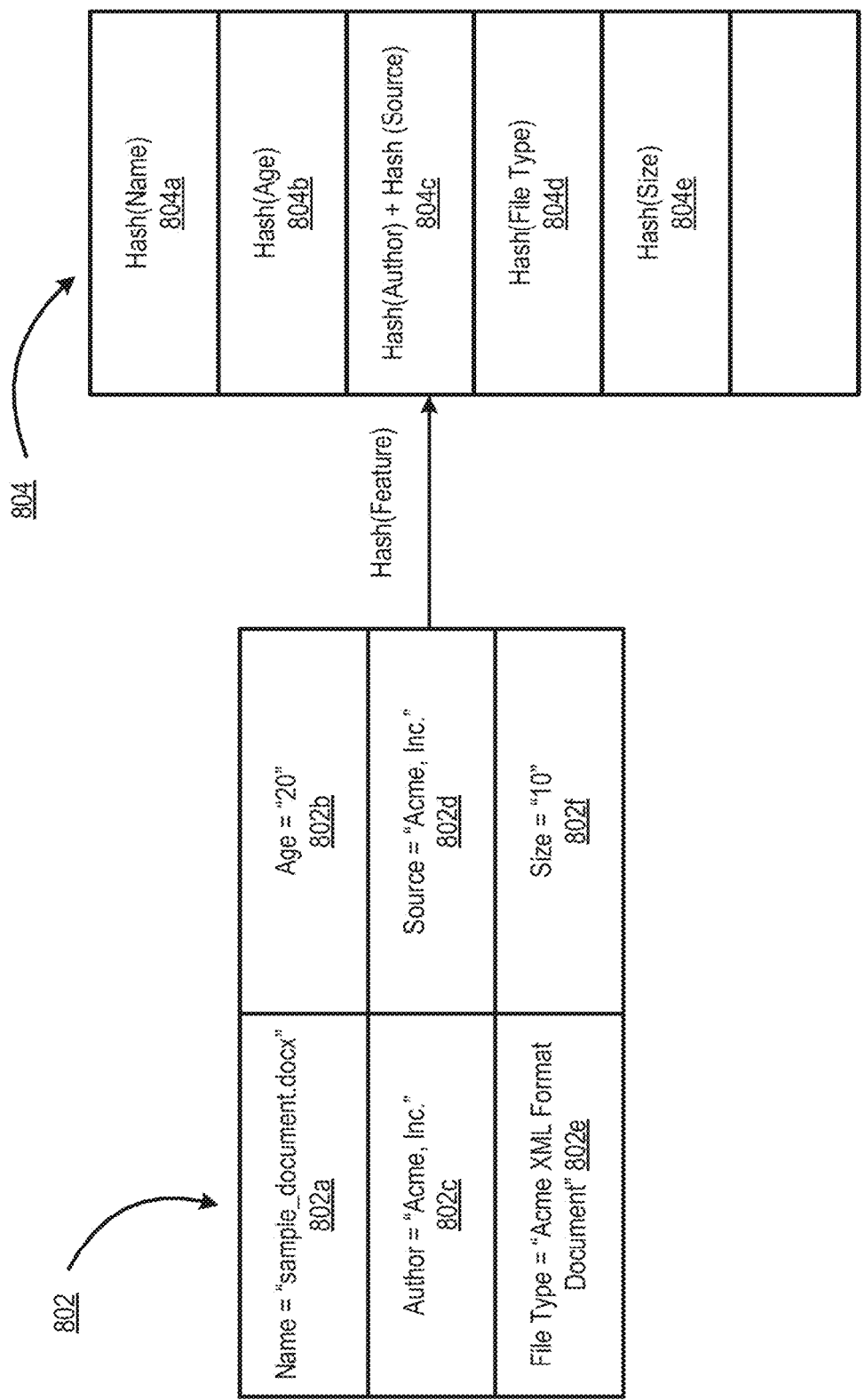
FIG. 8 is a diagram illustrating feature hashing, according to an embodiment.

A file compressor 108 can be a module and/or server component configured to receive a file as an input, and output a compressed file. File compression can allow for file sizes to conform to a single standard, and/or can increase efficiency of file analysis by removing data unnecessary for analyzing the file, and can also prevent file modifications from interfering with analysis of the file. For example, referring to FIG. 8, a file compressor 108 can compress a potentially malicious file, and/or data (strings, metadata, application programming interface (API) instructions, and/or similar data) into a vector of a predetermined size. The file compressor 108 can determine features (e.g., Portable Executable (PE) header field names, such as a name field 802a, an age field 802b, an author field 802c, a source field 802d, a file type field 802e, a size field 802f, and/or similar attributes) associated with the data 802, and can calculate a hash value associated with each of the features (e.g., can hash a value of the feature, such as "sample_document- .docx," and/or a name of the feature; e.g., "name" or "author").

The file compressor 108 can add each of the hash values 804a-804e to a bin in a vector 804 of a predetermined length (e.g., a length of 256 bytes). In other implementations, the file compressor 108 can add the original feature values (e.g., the value of the feature prior to a hash function) to a bin based on a hash value (for example, the feature name of 802b ("age") can result in a hash value "2", and therefore the value of the age 802b can be added to a bin 804b corresponding to the value "2," such as a location in the vector with an index of "2"). In some instances, when adding a value to a bin, the value of the bin (e.g., a counter within the bin) can be incremented by the value to be added to the bin. In other instances, any other arithmetic and/or logical operation can be performed on the value in the bin based on the value to be added to the bin. In still other instances, the value can be stored within that bin overwriting any previously stored value in that bin.

In some implementations, when the hash value of a feature is equal to a hash value of a different feature, the file compressor 108 can add the hash values and/or original feature values to the same bin. For example, the hash value of the "author" field 802c and the hash value of the "source" field 802d can both be added to the field for bin 804c, and/or both the value "source" and "author," or "Acme, Inc." and "Acme, Inc." can be added to a field for bin 804c (e.g., as separate values in a list of features associated with the bin, as a sum and/or similar combination of the hash values and/or feature values, and/or the like).

In other implementations, when the hash values of different features are the same, the file compressor 108 can add the first-calculated hash value to the bin 804c, and can discard the later-calculated hash value. For example, if the hash value of the "author" field 802c is calculated before the hash value of the "source" field 802d, and if the hash value of the "author" field 802c is added to the bin 804c, the file compressor 108 can discard the hash value of the "source" field 802d. Additionally, if the hash value for the "author" feature is the same as the hash value for the "source" value, the file compressor 108 can add the "author" feature value and/or hash value to a bin, and may discard the "source" feature value and/or hash value.

In some implementations, the file compressor 108 can determine to what bin to add the value by hashing the name of the feature. For example, the feature name (e.g., "Age") can be hashed to identify a value of "2". This can identify bin 804b as associated with "Age". In some implementations, if a feature value is a numerical value, the file compressor 108 can add the feature value to a bin, without hashing the feature value (e.g., can add the value "20" to bin 804b, rather than deriving a hash value for "20"). Thus, the name of the field can be hashed to identify the bin and the value can then be added to the bin. In some instances, if a feature value is a string value, the file compressor 108 can hash the string value to determine what value to add to a bin identified by a hash of the feature name. For example, the feature name "Author" can be hashed to identify bin 804c. The feature value "Acme, Inc." can be hashed to determine the value to add to the bin 804c. The values in the bins can be used in the malware analysis, as described in further detail herein.

The resulting vector can be used as an input file for the threat models described in further detail in at least FIGS. 3-6 and 9 herein. Hashing files and/or other data in this manner can allow the threat analyzer 114 to identify the unique features of the file and/or other data, and to ensure that the threat analyzer 114 processes a known number (and/or a known limit) of features in each file and/or other data. In some implementations, the file compressor 108 can compress potential malware files in other, similar ways (e.g., by compressing an entire potential malware file, by compressing strings within a potential malware file, and/or the like). In some implementations, instead of a file compressor, the malware detection server 102 can include a file unpacker configured to unpack compressed and/or otherwise altered files prior to processing.

An informational entropy calculator 110 can be a module and/or server component configured to calculate an informational entropy of a file (e.g., a file compressed by the file compressor, an otherwise processed file, and/or an uncompressed file), and/or a portion of the file. Specifically, the informational entropy calculator 110 can use the frequency of byte values found in the compressed file to calculate an informational entropy of the file and/or portion of the file. Further details of this process can be found in at least FIG. 3, described in further detail herein.

An abstract type determination module 112 can be a module and/or server component configured to determine an abstract type of a file, e.g., based on characteristics of the informational entropy of the file. For example, the abstract type determination module 112 can be a module and/or server component configured to determine that a file includes an image based on the value of the informational entropy, and/or based on the distribution of byte values in the file. As other examples, the abstract type determination module 112 can identify a file that includes text, a video, executable program code, and/or other data types. Further details can be found in at least FIG. 3, described in further detail herein.

A threat model manager 118 can be a module and/or server component configured to manage the training and/or definition of a threat model, e.g., using the informational entropy of the file, and/or related information. Further details can be found in at least FIGS. 3 and 4, described in further detail herein.

A threat analyzer 114 can be a module and/or server component configured to apply a threat model to an informational entropy value for a potential malware threat. The threat analyzer 114 can be configured to further generate a threat score by refining and/or translating a score generated by the threat model. Further details can be found in at least FIG. 5, described in further detail herein.

The at least one malware detection database 116 can be a data store and/or memory configured to store multiple records relating to threat models 116a, file samples 116b, and/or attributes 116c. Tables in the at least one malware detection database 116 can be distributed across multiple databases, or can be stored in one database. For example, the threat models table 116a can contain records relating to threat models defined by the threat model manager 118 and used by the threat analyzer 114 to generate a threat score for a potential malware threat. A record in a threat models table 116a can include an identifier of a threat model, a threat model type, threat model data, threat model metadata, a date the threat model was defined, created and/or updated, and/or other information relating to a threat model. Threat model types can include a random forest threat model, a deep neural network threat model and/or any other suitable model. More information on threat model types can be found at least in FIG. 4, described in further detail herein.

A file samples table 116b can include files of a known threat status (i.e., which are known to be malware or not malware), and can be used to train and/or generate a threat model. A record in a file samples table 116b can include a file sample identifier, a file sample threat status, file sample data, a date of submission, file sample entropy, and/or other information relating to a file sample. An attributes table 116c can include attributes to associate to file samples, e.g., when applying abstract types to processed files. Such attributes can include a file sample entropy, an indication of byte values in the file, a standard deviation associated with byte values in the file, a string length value associated with strings in the file, a string hash value of one or more strings in the file, metadata of the file, a length of the file, an author of the file, a publisher of the file, a compilation date of the file, and/or the like. Records in the attributes table 116c can include an attribute identifier, an attribute type, and/or other information relating to attributes.

Figure 2:
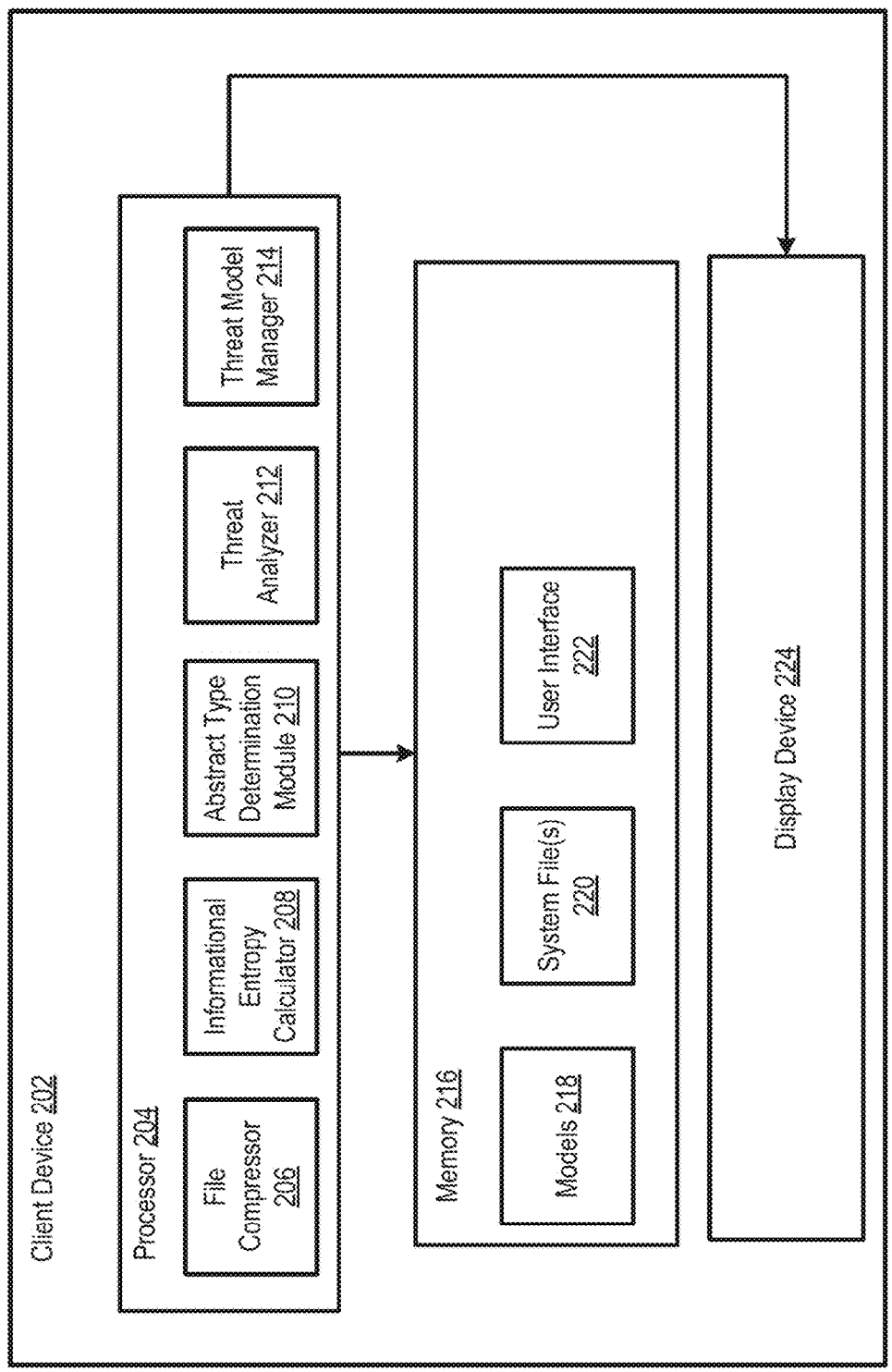
FIG. 2 is a schematic diagram illustrating a client device configured to detect malware, according to an embodiment.

FIG. 2 is a block diagram illustrating a client device 202 configured to detect malware, according to an embodiment. In some implementations, rather than performing malware detection from a malware detection server 102, a client device 202 can be configured to generate a threat model and/or assess a threat, e.g., in the absence of communication with a malware detection server 102. A client device 202 can be an electronic device operable by a user, including but not limited to a personal computer (e.g., a desktop and/or laptop computer), a mobile device (e.g., a tablet device and/or other mobile devices), and/or a similar electronic device. The client device can include at least one processor 204, at least one memory 216, and a display device 224. The at least one processor 204 can implement a file compressor 206, an informational entropy calculator 208, an abstract type determination module 210, a threat model manager 212, and a threat analyzer 214. Each of the modules and/or client device components is configured to perform similar functions as described in FIG. 1 with respect to file compressor 108, informational entropy calculator 110, abstract type determination module 112, threat model manager 118, and threat analyzer 114, respectively. The at least one memory 216 can be configured to store processor-readable instructions that are accessible and executable by the processor. The at least one memory 216 can also store threat models 218 generated by the threat model manager 118, system files 220 (e.g., files generated and/or saved on the client device 202), and/or a user interface 222. The threat models 218 can be similar to the threat models stored in threat models table 116a. The user interface 222 can be a software interface implemented by the processor and configured to display information to the user, such as threat scores, file information, and/or other threat analysis data. The display device 224 can be a screen and/or a similar display, and can be configured to display the user interface 222 to the user.

Figure 3:
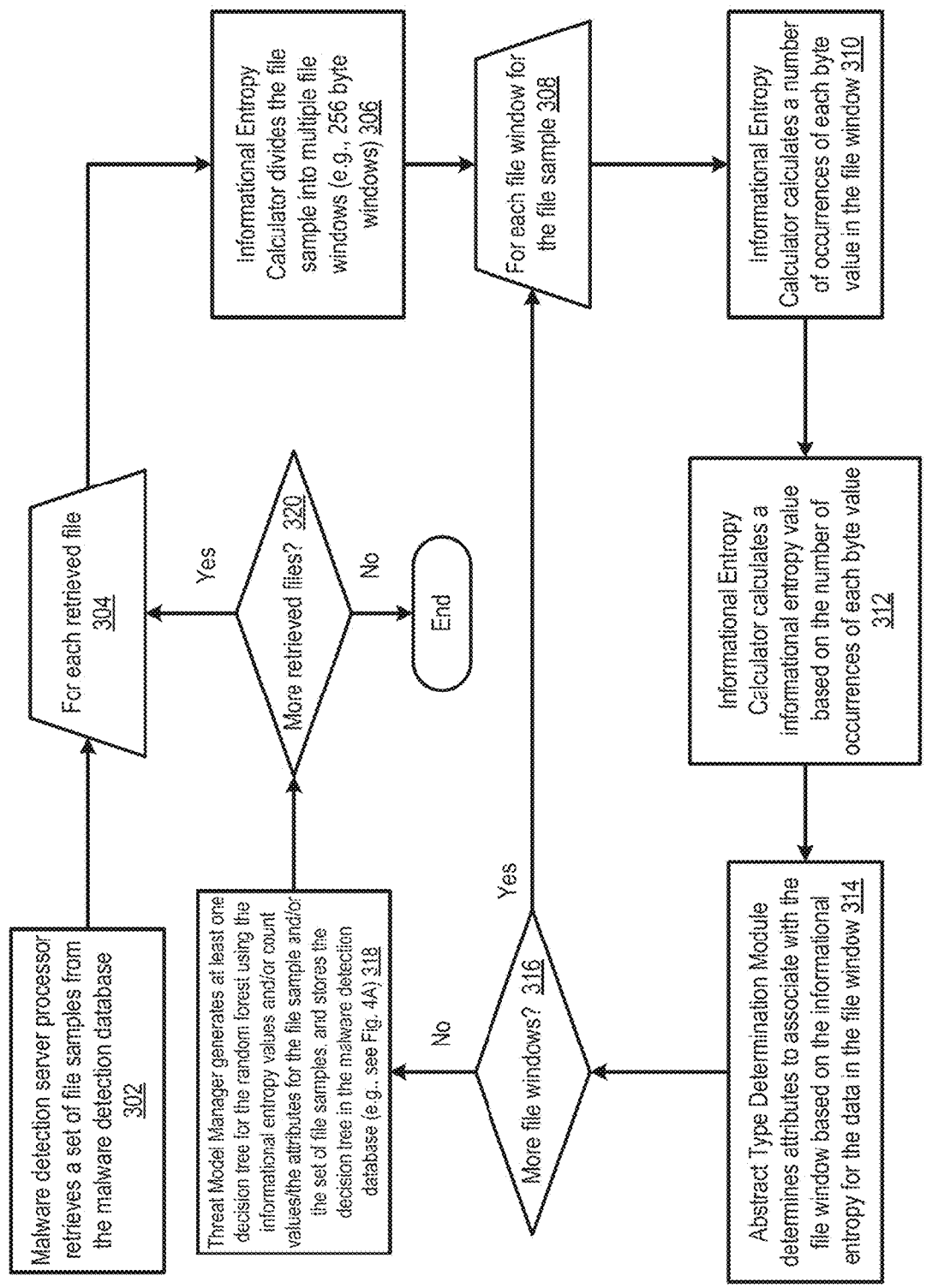
FIG. 3 is a logic flow diagram illustrating generating a threat model, according to an embodiment.

FIG. 3 is a logic flow diagram illustrating generating a threat model, according to an embodiment. In some implementations, a processor 104 at the malware detection server 102 can retrieve 302 a set of file samples from the file samples table 116b of the malware detection database 116. The file samples can be files provided to and/or collected by the malware detection server 102, e.g., received from a network administrator, retrieved from a malware sample database, and/or from similar sources. For each file retrieved 304 from the malware detection database 116, the informational entropy calculator 110 can divide 306 the file sample into multiple file windows. In some implementations, file samples can be divided into 256-byte (and/or a similar size) windows of data within the file sample. Dividing the file sample into file windows can involve reading a number of bytes equal to the size of a file window. For example, if the file windows are 256-byte file windows, the informational entropy calculator 110 can read the next 256 bytes of the file sample and process as a file window. As another example, a file window can contain 500 bytes, the informational entropy calculator 110 can read the next 500 bytes of the file sample, shift 250 bytes in the file sample, and read the next 500 bytes. In this manner, the informational entropy calculator 110 can generate overlapping file windows (e.g., where at least some file windows share bytes), and/or can generate file windows which contain mutually-exclusive bytes (e.g., where each file window contains bytes which are not in other file windows). For another example, each window can include 1000 bytes and the window can move 100 bytes to capture the next 1000 byte window. In some implementations, the informational entropy calculator 110 can divide the file sample into a predetermined and/or dynamically determined number of file windows of varying and/or equivalent sizes.

For each file window in the file sample 308, the informational entropy calculator 110 can calculate 310 a number of occurrences of each byte value and/or byte sequence observed in the file window. For example, if a byte value of "30" is found in the file window, the informational entropy calculator 110 can count the number of times a byte value of "30" appears elsewhere in the file window. In some embodiments, the informational entropy calculator 110 can also identify and count the number of times a particular byte sequence and/or pattern appears in the file window.

The informational entropy calculator 110 can use the number of occurrences of each byte value to calculate 312 an informational entropy value for the file window. The informational entropy value indicates the degree of variance and/or randomness of the data (e.g., can indicate whether there is a strong concentration of particular byte values in the file window, and/or whether there is a more even distribution of observed byte values in the file window). For example, the informational entropy value of a file window can be higher for file windows with more variation in byte values and/or byte sequences, than it may be for file windows with more uniformity in terms of represented byte values and/or byte sequences. For example, the informational entropy of a file window including only two distinct byte values (e.g., two values repeated across a 256 byte window) will be less than the information entropy of a file window including random values with very little repetition of values across the file window. As discussed in further detail herein, in some embodiments, the informational entropy calculator 110 can also identify and/or count a standard deviation of the byte values within a window, a string length of strings within the file, a string hash value associated with the strings within a file, and/or any other suitable characteristic.

Figure 7:
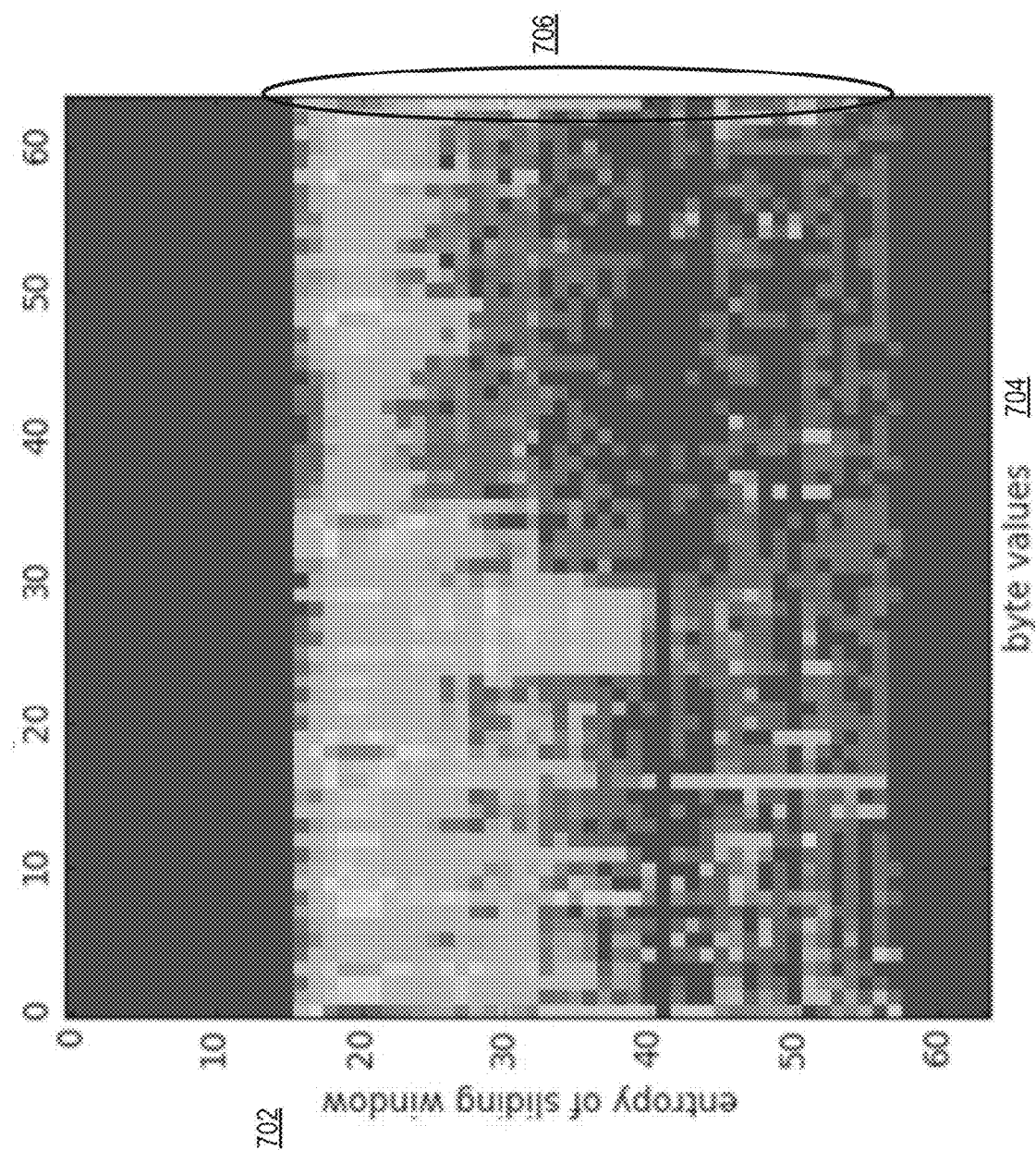
FIG. 7 is an informational entropy histogram for a file, according to an embodiment.

Referring to FIG. 7, in some implementations, the informational entropy calculator 110 can calculate a collection of informational entropy values based on a file. The example histogram plots an indication of the entropy of a sliding file window 702 against an indication of byte values 704 within a sliding window having that entropy, and can provide a visualization for a frequency at which various bytes appear in file windows having a specific entropy. Specifically, in the example of FIG. 7, the entropy values are divided into 64 different bins and/or buckets. Similarly, the entropy value for each sliding window is identified and/or normalized as being within one of 64 different buckets. For example, the byte values are normalized as being within one of 64 different bins and/or buckets, based on, for example, being within a particular range of values. Thus, in this example, since each byte can represent 256 different values, each bin includes a range of 4 different byte values. In other embodiments, any suitable number of bins and/or buckets can be used to represent, normalize and/or group the entropy values and/or the byte values of the file windows. In some embodiments, for example, 2, 8, 16, 32, 128 and/or any other suitable number of bins and/or buckets can be used to represent the entropy and/or byte values of a file window.

In the example shown in FIG. 7, each square and/or point in the graph/histogram represents an entropy bucket/byte value bucket. Similarly stated, each square represents a combination of an entropy value (or group or range of entropy values) for a sliding window and a byte value (or group or range of byte values) found within a sliding window having that entropy value. For example, 706 shows the count values (shown as shading) for the file windows in which a byte value within the bucket 63 (e.g., a byte value in the file window falls within bucket or bin 63) appears in the file. The shading (and/or color) of each square and/or point of the graph/histogram, represents how often the combination of that entropy value (or group or range of entropy values) and that byte value (or group or range of byte values) occurs within the file. Thus, a square will be lighter if that combination frequently occurs within the file windows of the file and darker if that combination does not frequently occur within the file windows of the file. Thus, the shading (or underlying value) of the square for that combination can be an aggregate for the count values for the file windows within a file. For example, if a first file window of a file has an entropy X and includes four byte values of 100, and a second file window of the file has an entropy X and includes seven byte values of 100, the aggregate count value representing the number of combinations of entropy value X and byte value 100 for that particular file would be eleven (and could be represented as a particular color or shading on a graph/histogram). Such a value (and/or set of values for each combination in a file) can then be input into a threat model to train the threat model and/or to identify a file as containing malicious code, as described in further detail herein. In other embodiments, any other suitable method (e.g., a numerical value or score used by the threat analyzer 114 of FIG. 1) can be used to represent the frequency of the combination within the file. The brightness of the value in the histogram can vary according to color gradient, and/or a similar mechanism.

In some implementations, file windows can be arranged in the histogram based on the informational entropy value of the file window (e.g., file windows with higher informational entropy values being shown first or last, and/or the like). Thus, the order of the representation of the data in histogram does not significantly change if a portion of the file sample is changed (e.g., if a user adds additional data to a text file, and/or the like), as the histogram does not rely on the manner in which bytes are sequenced and/or stored in the file sample to display information about the file sample. Thus, for example, if a malware file including an image is modified to be included with a different image, while the portion of the histogram associated with the image might change, the portion of the histogram relating to the malware would not change since the byte windows relating to the malware would have the same entropy. This allows the malware sample to be analyzed and recognized regardless of the code and/or instructions around the malware sample.

Using a histogram that does not rely on the order of bytes in the file sample also allows the threat analyzer 114 to analyze the file sample without prior knowledge of the nature of a file being analyzed (e.g., without knowing whether a file contains text, and/or without knowing whether image files typically store particular byte values at particular locations). In other words, the histogram can serve as a format-agnostic representation of the file sample, such that the threat analyzer 114 can determine attributes of the file sample, and/or a threat level for the file sample, without prior knowledge of the type of file being analyzed. The values associated with the histogram of FIG. 7 (e.g., the value of the combination represented by the shading (and/or color) of each square, the entropy bucket, the byte value bucket, the entropy value, the byte values, and/or the like) can be used as input into a model to identify potential malware, as discussed in further detail herein.

Referring back to FIG. 3, an abstract type determination module 112 can use the informational entropy value (e.g., of a file window) and/or a value associated with the combinations of an entropy value (or group or range of entropy values) for a sliding window and a byte value (or group or range of byte values) found within that sliding window for a file, to determine 314 attributes to associate with the file window, and/or the file sample as a whole. For example, the abstract type determination module 112 can determine a count value representing the number of combinations of an entropy value (or group or range of entropy values) for a file window and a byte value (or group or range of byte values) found within that file window, that the file is of a particular file type, that the file originated and/or is intended for use on or was retrieved from a particular operating system and/or environment (e.g., that the file was obtained from and/or intended for use on a device running Windows, iOS, Linux, and/or a similar operating system, and/or that the file was obtained from and/or intended for use on an Apache server, and/or the like), and/or that the file contains particular data, based on the informational entropy value, the number of entropy value/byte value occurrences within the file, and/or other attributes of the file. Specifically, for example, an image in a file can represent a specific type and/or level of entropy that is different than text in a file. In some implementations, the abstract type determination module 112 can also determine attributes to associate with the file sample after calculating an informational entropy value for each of the file windows in the file sample, and/or for a portion of the file sample, and/or after calculating a count value representing the number of combinations of an entropy value (or group or range of entropy values) for a file window and a byte value (or group or range of byte values) found within that file window. In some embodiments, an analysis model (e.g., a particular random forest model, deep neural network model, etc.) can be selected based on the type of file identified by the abstract type determination module 112. In other embodiments, the type of file can be an input to the analysis model. In still other embodiments, the abstract type determination module 112 does not identify file type based on information entropy, but instead passes the informational entropy values to the threat model manager, as described in further detail herein.

If there are additional file windows that have not been analyzed 316, the informational entropy calculator 110 can continue to calculate informational entropy values (and/or any additional attributes) for those file windows. The count values for the additional file windows can be added to and/or aggregated with the count values from the other file windows from the file. Thus, an aggregated count value for representing the number of combinations of entropy values (or group or range of entropy values) for a file (based on the file windows) and a byte value (or group or range of byte values) found within the file can be calculated. For example, if a first file window of a file has an entropy X and includes four byte values of 100, and a second file window of the file has an entropy X and includes seven byte values of 100, the aggregate count value representing the number of combinations of entropy value X and byte value 100 for that particular file would be eleven. In some embodiments, every file window in a file can be used to calculate the count values for that file. In other embodiments, fewer than every file window can be used.

In some implementations, the file samples can include the abstract types and/or attributes that the abstract type determination module 112 associates with the informational entropy values, e.g., for purposes of training the threat model to recognize associations between informational entropy values and the abstract types. If informational entropy values have been calculated for each of the file windows for the file sample, the threat model manager 118 can receive the informational entropy values for each of the file windows from the informational entropy calculator 110, the number of entropy value/byte value occurrences within the file, and/or the like. The threat model manager 118 can use the values to train and/or generate 320 the threat model based on, for example, previously knowing (e.g., based on a provided label) whether the file is malicious or benign.

In some implementations, the threat model manager 118 can also transform the count value for a file representing the number of combinations and/or occurrences of an entropy value (or group or range of entropy values) for a file window within that file and a byte value (or group or range of byte values) found within that file and/or other value provided to the threat model manager 118 (e.g., can normalize and/or otherwise alter the value) before using the value to train and/or generate the threat model. For example, a linear and/or a non-linear (e.g., logarithmic) transformation and/or normalization can occur prior to providing the value to the threat model. In other implementations, the threat model manager 118 can also receive a normalized and/or otherwise transformed value for use with the threat model.

For example, for a random forest model, the threat model manager 118 can generate at least one decision tree for the random forest model, e.g., using the informational entropy values (and/or the number of entropy value/byte value occurrences within the file) as a data space for generating the tree. The threat model manager 118 can also apply any attributes associated with the file sample to the decision trees generated for the random forest model (e.g., can associate a file type with the decision tree, and/or other information). The generated decision tree can be stored in the malware detection database 116.

Figure 4A:
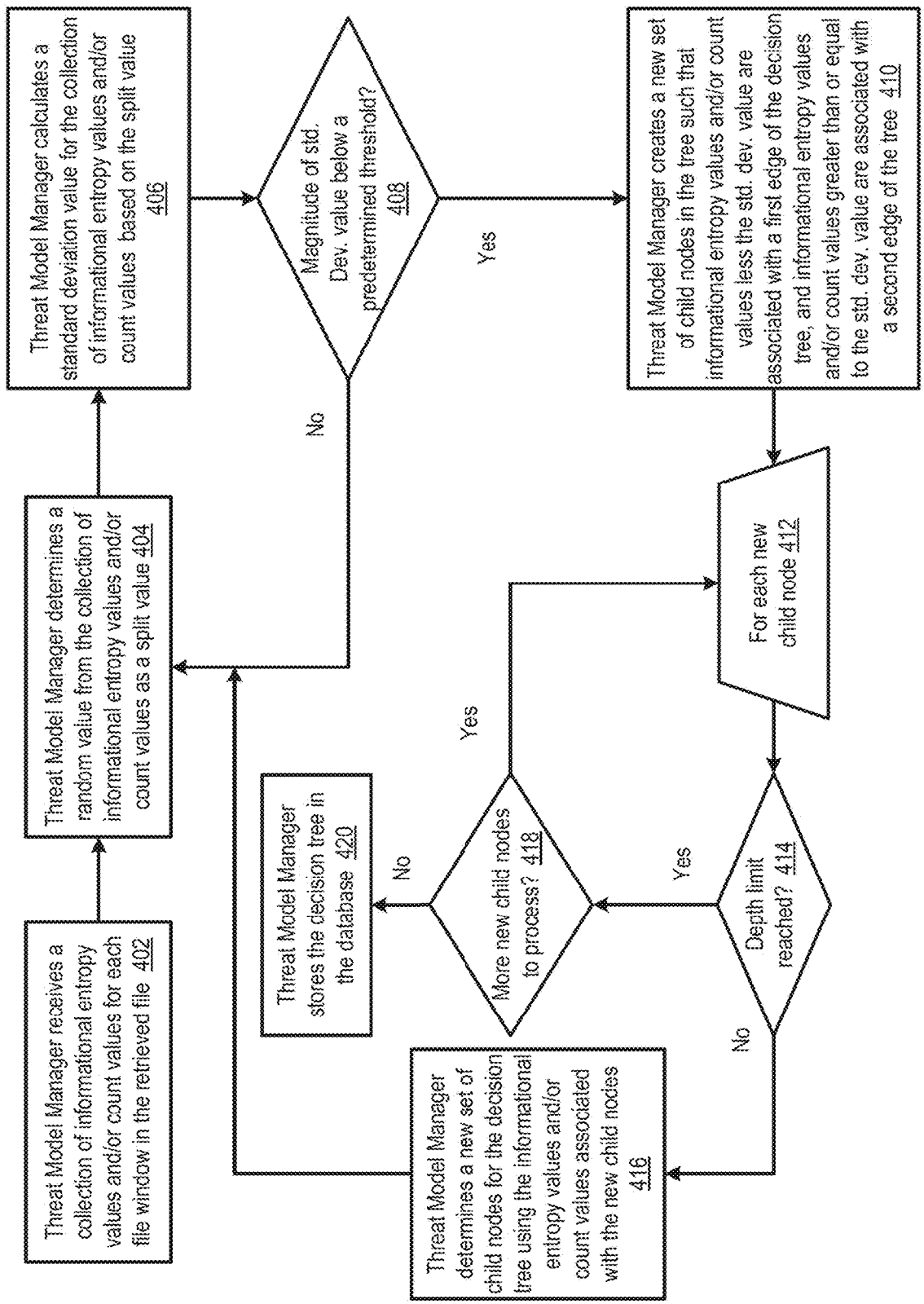
FIG. 4A is a logic flow diagram illustrating calculating an example threat model, according to an embodiment.

For example, referring to FIG. 4A, the threat model manager 118 can use informational entropy values calculated from file samples (and/or the number of entropy value/byte value occurrences within the file), to generate and/or train portions of a random forest model. For example, the threat model manager 118 can receive 402 a collection of informational entropy values (e.g., see 422 of FIG. 4B) and/or a set of count values for a file representing the number of combinations of specific byte values (or group or range of byte values) within file windows having a specific entropy value (or group or range of entropy values) within a set of files retrieved from the malware detection database 116, and/or from multiple file samples. The threat model manager 118 can determine (e.g., select) 404 a random value from the collection of informational entropy values (e.g., see 424 of FIG. 4B) and/or the count values to use as a root and/or parent node value of a decision tree in the forest. In some embodiments, to ensure that the random value does not generate an unbalanced tree, the threat model manager 118 can, for example, calculate 406 a standard deviation value for the collection of informational entropy values and/or the count values, e.g., using the random value as a mean value for purposes of the calculation. If the magnitude of the standard deviation value falls below a predetermined threshold 408 (e.g., if the magnitude of the standard deviation value indicates that the random value is not an outlier in the collection of informational entropy values and/or the count values), the threat model manager 118 can define 410 a parent node in the decision tree with a weight and/or value of the randomly-selected value (e.g., count value), and can divide the remaining collection of values into two groups (e.g., a group of values greater than or equal to the randomly-selected value, and a group of values less than the randomly-selected value; see 426 of FIG. 4B) corresponding to two new child nodes. If the random value is determined to be an outlier, the threat model manager 118 can select another random value, and recalculate a standard deviation value using the new random value, until the threat model manager 118 has found a value that is not an outlier.

Figure 4B:
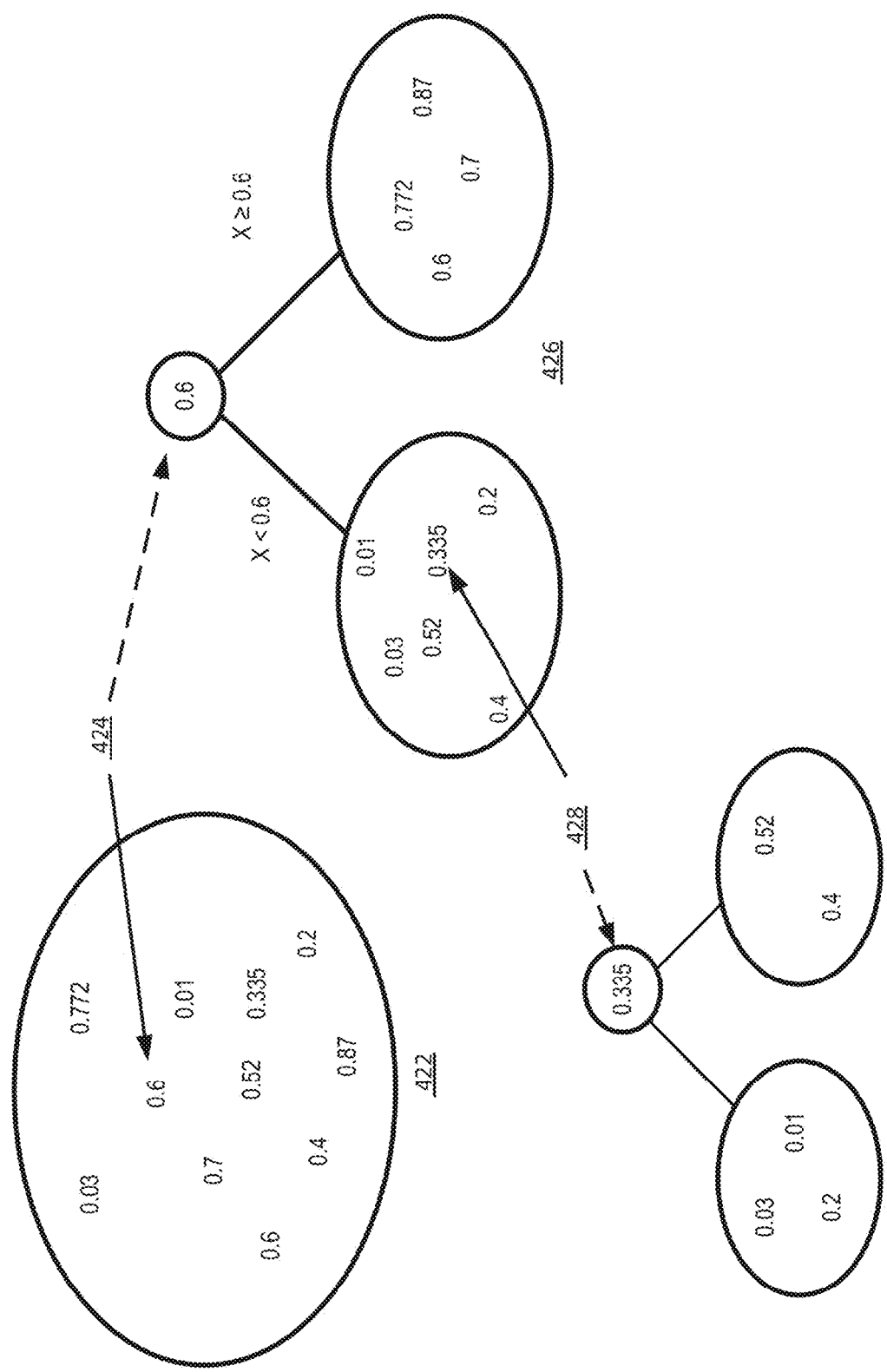
FIG. 4B is a block diagram illustrating calculating an example threat model, according to an embodiment.

The threat model manager 118 can then recursively continue to generate parent and child nodes of the decision tree, e.g., by taking each new child node 412 associated with a new group of values, and determining 416 a new set of child nodes for the new child node using a new randomly-selected value (e.g., count value) from the new group of values (e.g., see 428 of FIG. 4B). If a depth limit is reached 414 for a particular path of the decision tree, the threat model manager 118 can determine whether there are other new decision tree child nodes to process 418, and can continue to recursively define new parent and child nodes of the decision tree for those new child nodes. The threat model manager 118 can also check to determine whether there are at least two or three values at each decision tree branch being processed by the threat model manager 118. If there are less than two or three values from which to select the randomly-selected value for a particular branch, the threat model manager 118 can add the values to the decision tree as a new set of parent and/or child nodes, e.g., without calculating a standard deviation value, and can proceed to process the next new child node. After the data has been processed, the threat model manager 118 can define leaf nodes of the decision tree indicating whether the file is malware or benign. The leaf nodes can be based on the previously provided label and/or indication specific to whether the file with the specific characteristics and/or attributes is malware and/or benign. The final decision tree can then be stored 420 in the malware detection database 116.

In other embodiments, any other values and/or collection of values can be used as inputs to and/or decision points of the decision trees such as, for example, a number of entropy value/byte value occurrences within the file, a file sample entropy, an indication of byte values in the file, a standard deviation associated with byte values in the file, a string length value associated with strings in the file, a string hash value of one or more strings in the file, metadata of the file, a length of the file, an author of the file, a publisher of the file, a compilation date of the file, and/or the like.

In some implementations, the trained random forest model, generated based on the definition of multiple decision trees, can include a random forest classifier. The random forest classifier can include a set of classifications with which the random forest model can classify a particular potentially malicious malware sample file. For example, classifications can include a set of data points, thresholds, and/or other values that can allow the trained random forest model to associate a potentially malicious malware sample with different classes of malware, different classes of malware sources, different classes of malware severity, and/or similar classifications. Said another way, the random forest classifier can be a boundary line that can be defined by the random forest model as it is trained, that the random forest model can use to classify potentially malicious malware samples. The random forest classifier can be used to determine whether a potentially malicious malware sample is safe, or whether the potentially malicious malware sample may be malware.

In some implementations, the threat model manager 118 can use a collection of informational entropy values and/or a set of count values for a file representing the number of combinations of specific byte values (or group or range of byte values) within file windows having a specific entropy value (or group or range of entropy values), corresponding to multiple file samples to calculate and/or train multiple decision trees to add to a random forest model. For example, the threat model manager 118 can select a random value from a set of informational entropy values (and/or the number of entropy value/byte value occurrences within the file) corresponding to the file windows of a particular file. The random value can be used as a branching point of a decision tree in a random forest tree model (e.g., such that values less than the random value correspond with the left branch, and values greater than the random informational entropy value correspond with the right branch). The threat model manager 118 can continue to create and/or define branching points in the tree by selecting random values in each portion of the divided data, until predetermined decision tree criteria are met (e.g., there are less than two values on either side of a branching point, a decision tree depth limit has been reached, and/or the like). The final node of each branch of the decision tree can correspond to the prediction made by the tree (e.g., whether or not a file is a threat, a probability that a file is a threat, and/or similar results). The threat model manager 118 can generate multiple decision trees using the values from multiple file samples and/or can generate multiple decision trees using values from a single file sample. In some implementations, instead of selecting random values from the collection of values, the threat model manager 118 can use the mean and/or median of the collection of values (e.g., the number of entropy value/byte value occurrences within the file) to generate branching points. The decision trees can effectively define a boundary and/or threshold between uninfected files and infected malicious files representing the values of the files.

As another example, for a deep neural network model, the threat model manager 118 can input the informational entropy values and/or a set of count values for a file representing the number of combinations of specific byte values (or group or range of byte values) within file windows having a specific entropy value (or group or range of entropy values) into the deep neural network model and train the model using the values. In some implementations, the threat model manager 118 can wait until each of the file samples have been processed, and provide the collection of values obtained from each of the file samples to the deep neural network model during the same training session. In other embodiments, any other values and/or collection of values can be used as inputs to the deep neural network model such as, for example, a number of entropy value/byte value occurrences within the file, a file sample entropy, an indication of byte values in the file, a standard deviation associated with byte values in the file, a string length value associated with strings in the file, a string hash value of one or more strings in the file, metadata of the file, a length of the file, an author of the file, a publisher of the file, a compilation date of the file, and/or the like.

For example, for a deep neural network model, the threat model manager 118 can be configured to generate a layer of input nodes (e.g., one input node configured to receive a count value representing the number of combinations of an entropy value (or group or range of entropy values) for a file window and a byte value (or group or range of byte values) found within that file window, multiple input nodes configured to receive each of the collection of count values for a file sample, and/or other values derived from the entropy values of the file sample). The threat model manager 118 can also generate at least one layer of hidden nodes (e.g., at least one layer of intermediate nodes between the input and output nodes). Each layer of nodes can be fully connected to the previous layer of nodes. For example, the input layer of nodes can be fully connected to each of the nodes in a first layer of hidden nodes, a second layer of hidden nodes can be fully connected to each of the nodes in the first layer of hidden nodes, and a layer of output nodes can be fully connected to each of the nodes in the second layer of hidden nodes. Each node can have a weight associated with its edge (e.g., its connection) to another node. For example, a path between the input node and one of the hidden layer nodes can have a weight of a positive or negative value. The deep neural network can be a feedforward neural network (e.g., where input flows in one direction from, for example, the input nodes to the output nodes), a recurrent neural network (e.g., where looped paths can exist between nodes in the neural network), and/or a similarly-structured neural network.

To train the deep neural network model, in some implementations, the threat model manager 118 can propagate the informational entropy value(s) of a file sample through the deep neural network model (e.g., from the input node(s) to the output node(s)). For example, if the deep neural network is provided a count value representing the number of combinations of an entropy value (or group or range of entropy values) for a file window and a byte value (or group or range of byte values) found within that file window as an input, the input node can pass the count value to each of the hidden nodes to which it is connected. Each hidden node can use an activation function (using a weight value for the edge between the hidden node and the previous node) to calculate a value that is propagated to the next node. In some implementations the value may only be propagated to the next node if the function outputs a value above a predetermined activation threshold. The process continues until values are propagated to the output node layer, where the value is compared to an expected value (e.g., the expected probability that the file contains malware), at which point the deep neural network model can be modified incrementally (e.g., the weights of the edges in the network can be modified) until the deep neural network model outputs values statistically similar to an expected value.

In some instances, the trained deep neural network model can include a deep neural network classifier. The deep neural network classifier can include a set of classifications with which the deep neural network model may classify a particular potentially malicious malware sample file. For example, classifications can include a set of data points, thresholds, and/or other values that can allow the trained deep neural network model to associate a potentially malicious malware sample with different classes of malware, different classes of malware sources, different classes of malware severity, and/or similar classifications. Said another way, the deep neural network classifier can be a boundary line that can be defined by the deep neural network model as it is trained, that the deep neural network model can use to classify potentially malicious malware samples. The deep neural network classifier can be used to determine whether a potentially malicious malware sample is safe, or whether the potentially malicious malware sample may be malware.

In implementations using a deep neural network model, the deep neural network model can receive one or more count values (and/or other values) of the input file, and/or a collection of informational entropy values corresponding to the input file, and output a threat status (e.g., "malware" or "not malware") and/or a probability that the file is malware. For example, the deep neural network can include a number of input nodes equal to the number of file windows expected from a compressed file and/or file sample, and/or can include one input node accepting one or more count values of the compressed file. The deep neural network model can also include one output node (e.g., outputting a probability that the file is malware), two output nodes representing two threat statuses of the file (e.g., "malware" or "not malware"), and/or can include a variable number of output nodes which collectively can indicate a threat status, and/or a probability that a file is malware and/or contains malicious data.

The deep neural network can also include multiple hidden layers fully connected to the input and/or output nodes, which can include activation values and/or weights which can be altered as the deep neural network model is trained on file samples from the file samples table 116*b*. The deep neural network model can be trained using supervised learning techniques, using, for example, the known threat status of the file samples to estimate a degree of error between the deep neural network model's prediction and the actual threat status of the file samples to train the deep neural network until the error is reduced below a predetermined threshold.

In some implementations, the deep neural network model can be trained using unsupervised learning, e.g., using a decoder function to interpret the output of the deep neural network, to determine whether the deep neural network's output correctly corresponds to the input provided. Unsupervised learning can be implemented, for example, when a file sample does not include a label and/or other information indicating whether or not the file sample is an example of a malicious file sample. In some implementations, the deep neural network can be provided input for multiple file samples (e.g., count values and/or informational entropy values for multiple file samples) at once, and/or can be provided input for each file sample sequentially.

While examples herein describe a random forest and/or deep neural network threat model, other suitable model types, and/or a combination of model types, can be used. For example, a threat model can combine components of a random forest and a deep neural network to form a composite threat model, and/or a threat model can calculate threat scores for a potentially malicious sample file based on output generated by both random forest and deep neural network models. Similarly, in other implementations, other suitable analysis models can be used to process the informational entropy values. Further, other suitable analysis models can include classifiers that can be used to classify potentially malicious sample files. In some potentially malicious sample files, based on the potentially malicious sample file metadata, classifiers can be n-dimensional, e.g., based on the complexity of the potentially malicious sample file, based on the number of classifications in the set of classifications being analyzed, and/or based on other factors.

In some implementations, if there are more file samples with which to train and/or generate the threat model 322, the file compressor 108 can compress the next file sample (or the informational entropy calculator 110 can process the next file sample without the file compressor 108 compressing the file sample), and the process can repeat until each of the retrieved file samples have been processed. Each sample can be used to further define and/or refine the threat model.

Figure 5:
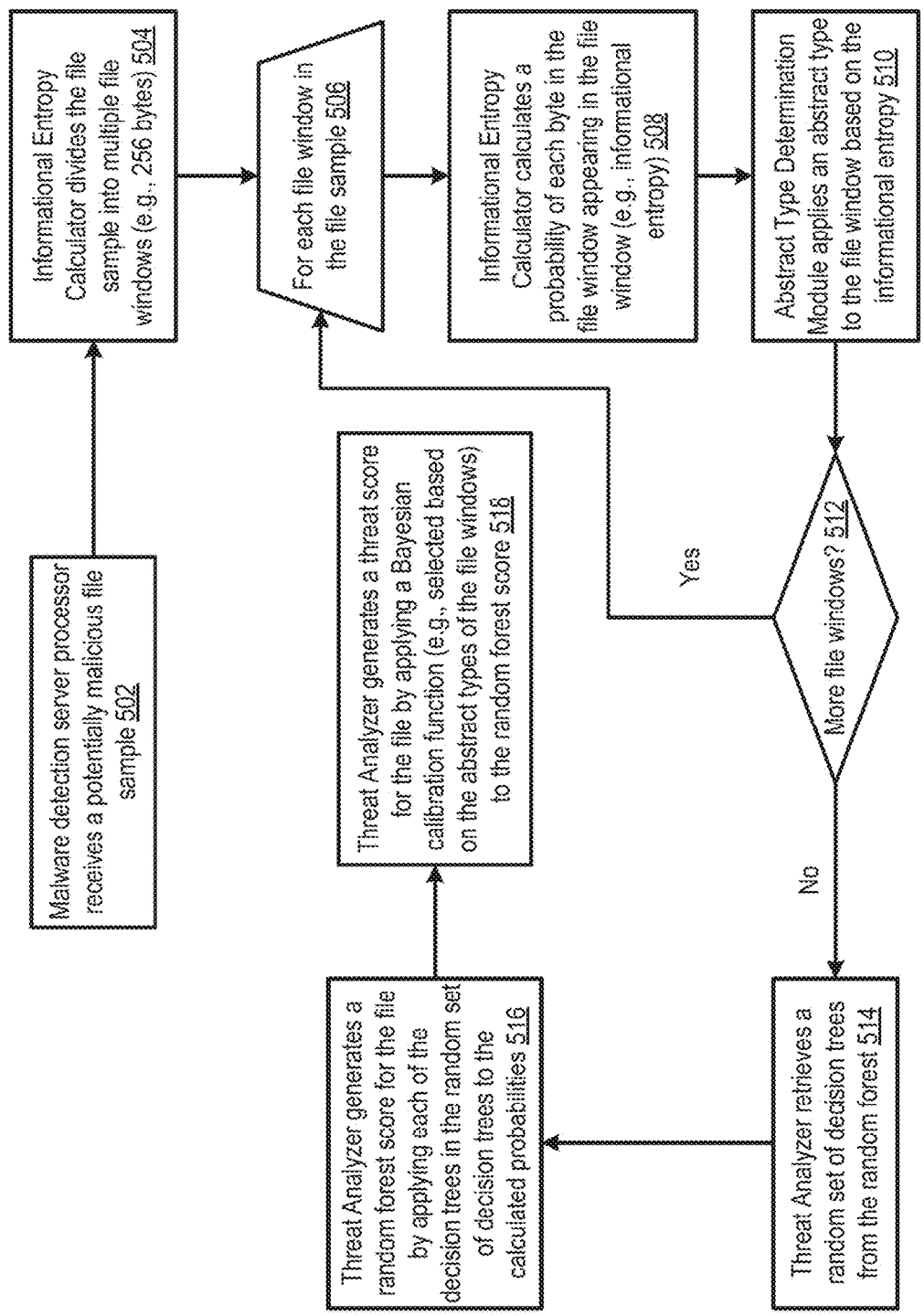
FIG. 5 is a logic flow diagram illustrating calculating a malware threat score, according to an embodiment.

FIG. 5 is a logic flow diagram illustrating calculating a malware threat score, according to an embodiment. For example, in some implementations, a processor 104 at the malware detection server 102 can receive 502 a potentially malicious file sample for analysis, e.g., from a client device and/or from an external server. In a process similar to how the malware detection server 102 can prepare file samples for training a threat model, the informational entropy calculator 110 can divide 504 the compressed potentially malicious file sample (or, in other instances, an uncompressed potentially malicious file sample) into multiple file windows (e.g., multiple file windows of a predetermined size, a predetermined number of file windows, and/or the like). For each window in the file sample 506, the informational entropy calculator 110 can calculate 508 a frequency of each byte in the file window appearing in the file window, e.g., by calculating the occurrences of each byte value appearing in the file window, and can then calculate an informational entropy value using the occurrences of each byte value. The abstract type determination module 112 can use the calculated informational entropy value and a threat model to apply 510 one or more abstract types, and/or one or more attributes, to the file window. For example, the abstract type determination module 112 can compare the informational entropy value to the threat model, and/or otherwise use the threat model, to identify attributes and/or abstract types to apply to the file window, a portion of the file windows, and/or the file sample as a whole.

If there are more file windows in the potentially malicious file sample 512, the informational entropy calculator 110 can continue to calculate informational entropy values for each of the file windows. In other embodiments, additional attributes can be calculated and/or identified, such as, for example, a file sample entropy, an indication of byte values in the file, a standard deviation associated with byte values in the file, a string length value associated with strings in the file, a string hash value of one or more strings in the file, metadata of the file, a length of the file, an author of the file, a publisher of the file, a compilation date of the file, data pertaining to whether a valid signature is included with the file, other Portable Executable (PE) header information (including but not limited to the size of the header and/or the size of components of the file, such as image sizes and/or the size of the code, versions of operating systems configured to run and/or open the file, and/or similar information), and/or the like.

If each of the file windows has been processed, a threat analyzer 114 can retrieve 514 a threat model (e.g., a trained deep neural network model, a random forest model, and/or the like), and can use the threat model to calculate 516 a threat score. For example, the threat analyzer 114 can calculate a set of count values for a file representing the number of combinations of specific byte values (or group or range of byte values) within file windows having a specific entropy value (or group or range of entropy values) (e.g., where the count value is unprocessed, normalized, transformed, and/or the like), and can retrieve a random set of decision trees from a random forest model stored in the malware detection database 116. The threat analyzer 114 can traverse each of the decision trees, e.g., using one or more count values representing the number of combinations of an entropy value (or group or range of entropy values) for a file window and a byte value (or group or range of byte values) found within that file window, to obtain a decision tree score and/or evaluation. In some implementations, in addition to, and/or instead of, transforming the value provided to the model for processing, the threat analyzer 114 can combine values associated with feature sets with the count value (e.g., can perform a linear and/or non-linear combination of the count value with the values associated with the feature sets, and/or the like), to generate combined feature values to provide to the model for processing.

Traversing a decision tree can involve determining whether the count value is greater than, equal to, or less than a value at a parent node in the decision tree. If the count value is greater than or equal to the value at the parent node, the threat analyzer 114 can move to a child node in the decision tree corresponding to values greater than or equal to the value at the parent node. If the count value is less than the value at the parent node, the threat analyzer 114 can proceed to a child node in the decision tree corresponding to values less than the value at the parent node. The threat analyzer 114 can continue to traverse the decision tree until it has reached a leaf node (e.g., a node with no child nodes), at which point the value at the leaf node can be provided to the threat analyzer 114 as the decision tree score and/or evaluation. For example, the leaf node can include a value indicating a probability that the potentially malicious file sample is malware, based on the count values and/or informational entropy of the file sample. The leaf node can also include other evaluations, such as a binary value indicating whether the file sample is malware or not, and/or other evaluation information. The threat analyzer 114 can perform this traversal with each of the decision trees in the random set of decision trees from the random forest model, and can average the decision tree scores (and/or otherwise combine the decision tree evaluations), to determine a final random forest model score for the potentially malicious file sample. In other instances, criteria other than or in addition to the average informational entropy value and/or a count value representing the number of combinations of an entropy value (or group or range of entropy values) for a file window and a byte value (or group or range of byte values) found within that file window of the file sample, such as, for example, informational entropy patterns, blocks of entropy values, a particular concentration of entropy values, an indication of byte values in the file, a standard deviation associated with byte values in the file, a string length value associated with strings in the file, a string hash value of one or more strings in the file, metadata of the file, a length of the file, an author of the file, a publisher of the file, a compilation date of the file, and/or the like, can be used.

In other embodiments, for a deep neural network model, the threat analyzer 114 can instead provide the set of informational entropy values from each of the file windows, a set of count values for a file representing the number of combinations of specific byte values (or group or range of byte values) within file windows having a specific entropy value (or group or range of entropy values), and/or the like, as an input to the deep neural network model input node(s). The deep neural network model can then evaluate the count values and/or the informational entropy value(s) to determine an output indicating a probability that the potentially malicious file sample is malware, and/or a similar determination indicating whether the potentially malicious file sample is or is not malware. The output of the deep neural network model can be the deep neural network model score for the file sample.

After a threat model score has been calculated, the threat analyzer 114 can generate 518 a final threat score for the potentially malicious file sample, e.g., by normalizing and/or otherwise processing the threat model score (e.g., produced by the threat model) to correspond to an intuitive value for indicating a potential threat to a specific user, device, network, and/or the like. For example, the threat analyzer 114 can apply a calibration and/or normalization function (e.g., a Bayesian calibration function) to the threat model score, to produce a final score indicating a probability that the potentially malicious file sample is malware. The threat analyzer 114 can apply the same calibration function to each threat model score calculated by the threat analyzer 114, and/or can select particular calibration functions, e.g., based on abstract types applied to file windows of the file sample, based on the type of threat model used to calculate the threat model score, based on the type of network from which the file sample was retrieved, the manner in which the file sample was provided to the malware detection server 102, and/or based on similar criteria.

The threat analyzer 114 can also take into account the general security of the network (and/or the historical security of a network) and/or a type and/or nature of a business hosting the network (e.g., whether the network from which the potentially malicious file sample is particularly at a higher likelihood of being infected and/or targeted by malware), user input relating to the nature of the potential threat, and/or other such factors, to apply weights and/or a normalization function to a threat model score. The threat analyzer 114 can also use a rate of false positives and/or false negatives obtained from previous applications of a threat model to file samples from the particular network to determine a calibration function to apply to the threat model score (e.g., where the selected calibration function can adjust the threat model score based on its predicted degree of inaccuracy, and/or the like). This factor can be updated and/or modified as the threat model is further trained and/or refined to reduce false positives and/or negatives.

In some implementations, the threat analyzer 114 can output the threat score to a user and/or administrator for further review. The threat score can thus be a user and/or network specific score that indicates a probability that the file includes malicious code. In other instances, the threat analyzer 114 can compare the threat score to a predetermined criterion (e.g., a threshold). If the threat score meets the predetermined criterion, the threat analyzer 114 can take identify the file as malware and take appropriate action such as, for example, quarantining the file, removing and/or deleting the file, sending a notification to a user about the file, cleaning the file, allowing the file to execute within a virtual container (e.g., sandbox, virtual machine, etc.), and/or any other suitable action.

In some embodiments, potential malware sample files, and sample files being used to train a threat model, can be compressed prior to being analyzed. For example, in such embodiments, the files may be compressed before the informational entropy calculator 110 generates file windows and/or file strings from the file, e.g., by an optional file compressor 108. In such embodiments, the files can also be received in a compressed form.

While described above as using informational entropy and/or a number of entropy value/byte value occurrences within the file to identify potential malware using a machine learning model (e.g., random forest, deep neural network, etc.), in other embodiments, other factors and/or parameters can be used as inputs to the model instead of or in addition to the informational entropy and/or a number of entropy value/byte occurrences within the file. Such values can be calculated and/or identified by the informational entropy calculator (e.g., informational entropy calculator 110 of FIG. 1). Using a combination (e.g., linear combination, non-linear (e.g., logarithmic) combination, mathematical operation on, Boolean operation on, etc.) of these factors can increase the reliability of the malware detector. For example, in some implementations, the informational entropy calculator 110 can generate a composite set of data on which to train the threat model, and/or to generate a composite set of data for a potentially malicious sample file that can be analyzed by a trained threat model. The informational entropy calculator 110 can perform a combination technique (e.g., such as a logarithmic and/or similar technique) on both the informational entropy values, metadata associated with the files being processed, and/or other data, and can use the combined data to train the threat model, and/or to analyze a potentially malicious sample file. The informational entropy calculator 110 can also provide the combined data to a threat analyzer 114 such that the threat analyzer 114 generates a visualization of the data.

For example, a parameter associated with a combination of an entropy value (or group or range of entropy values) for a file window and a standard deviation of the byte values (or group or range of standard deviation of byte values) found within that sliding window can be defined. Such a parameter can be plotted on a histogram similar to the histogram plot of FIG. 7 with, for example, the y-axis representing the entropy value for a file window and the x-axis representing the standard deviation of the byte values within that sliding window. Similar to FIG. 7, the values can be divided into different bins and/or buckets to be represented on the plot. Each square and/or point in the graph/histogram can represent an entropy bucket/byte standard deviation value bucket combination. Similarly stated, each square represents a combination of an entropy value (or group or range of entropy values) for a sliding window and a byte standard deviation value for within that sliding window. The shading (and/or color) of each square and/or point of the graph/histogram, can represent how often the combination of that entropy value (or group or range of entropy values) and that byte standard deviation value (or group or range of byte standard deviation values) occurs within the file windows of the file. In some embodiments, this value can be used as an input into the model to identify malware.

For another example, a parameter associated with a combination of string lengths (or a range or group of string lengths) for a file and a string hash value (or group or range of string hash values) found within that file can be defined. The string length can be a length of a string (or group of characters) under analysis and the string hash value can be an output of a hash value using the byte values of the characters of that string as input (or any other suitable value associated with that string). This can allow calculation of a number of combinations of string lengths and string hash values within a file. Such a parameter can be plotted on a histogram similar to the histogram plot of FIG. 7 with, for example, the y-axis representing the string length value for the string and the x-axis representing the string hash value. Similar to FIG. 7, the values can be divided into different bins and/or buckets to be represented on the plot. Each square and/or point in the graph/histogram can represent string length bucket/string hash value bucket combination. Similarly stated, each square represents a combination of a string length (or group or range of string lengths) and a string hash value (or group or range of string hash values) for the file. The shading (and/or color) of each square and/or point of the graph/histogram, can represent how often the combination of that string length (or group or range of string lengths) and that string hash value (or group of string hash values) occurs within the file. This value can be used as an input into the model to identify malware.

Figure 6:
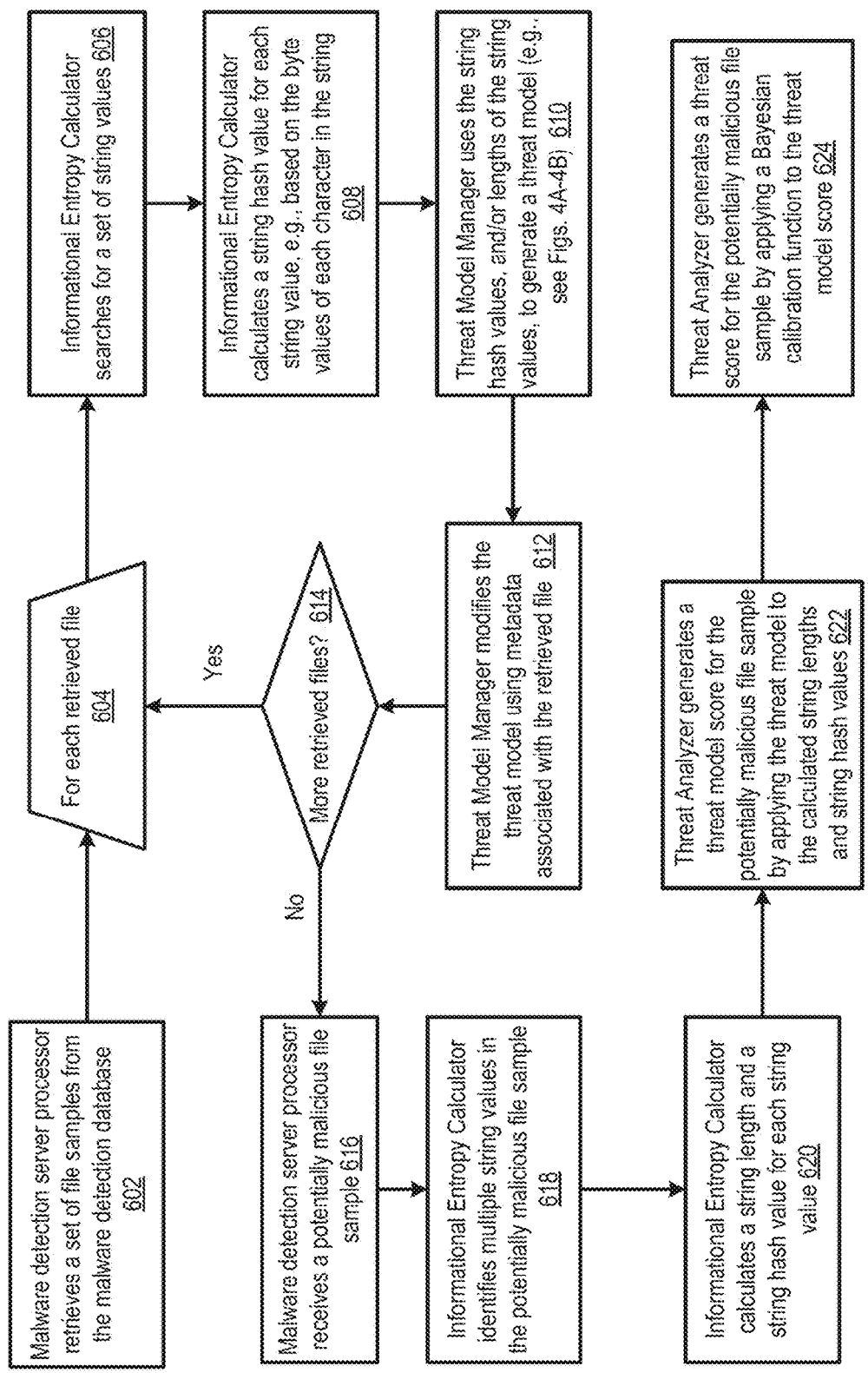
FIG. 6 is a logic flow diagram illustrating using string values to identify malware samples, according to an embodiment.

For example, FIG. 6 is a logic flow diagram illustrating using string values to identify malware samples. For example, in some implementations, the malware detection server processor 104 can retrieve 602 a set of file samples from the malware detection database. For each retrieved file 604, the informational entropy calculator 110 can search 606 for multiple string values in the file sample. The informational entropy calculator 110 can identify strings in the file sample based on a predetermined list of string values, based on identifying particular byte values in a string, and/or based on similar information. The informational entropy calculator 110 can calculate 608 a string hash value for each identified string value (e.g., using as inputs the byte values of the characters within the string values), and can calculate a length of the identified string values (e.g., based on the number of characters in the string, based on the byte values of the characters, and/or the like). The threat model manager can use 610 the string hash values and the string lengths to generate a threat model (e.g., similar to the process shown in FIGS. 4A-4B with respect to generating a threat model based on byte values and standard of deviation values). For example, the informational entropy calculator 110 can calculate an informational entropy value for each file, based on the string lengths and/or the string hash values.

The threat model manager 118 can modify 612 the threat model, e.g., using metadata associated with the retrieved file. For example, the threat model manager 118 can use information such as a length of the file, an author of the file, a publisher of the file, a compilation date of the file, and/or similar metadata, to modify the generated threat model, such that the threat model uses the file metadata to further predict the nature of potentially malicious file samples. The threat model manager 118 can generate additional decision trees based on the file metadata, can train a neural network threat model using the metadata as inputs in addition to string lengths and string hash values, or can perform other similar modifications on the threat model to incorporate file metadata into the threat model. For example, referring to FIG. 8, the vector 804 can be used as input for modifying the generated threat model (e.g., by using the hash values and/or feature values to generate the additional decision trees, and/or by using the vector 804 as learning input on which to train the neural network), where hash values and/or other data stored in the vector 804 can be provided to the threat model, and/or added to the threat model, to predict whether or not potentially malicious sample files are malicious. Returning to FIG. 6, the threat model manager 118 and informational entropy calculator 110 can continue these processes if there are more retrieved files to process 614.

After the threat model has been refined, the malware detection server processor 104 can receive 616 a potentially malicious file sample, and can identify 618 from the file sample multiple string values, from which the malware detection server processor 104 can calculate 620 file sample string hash values and file sample string lengths. The threat analyzer 114 can generate a threat model score 622 for the potentially malicious file sample by applying the threat model to the calculated string lengths and string values (e.g., in a manner similar to that described in FIG. 5). The threat analyzer 114 can also generate 624 a threat score for the potentially malicious file sample by applying, for example, a Bayesian calibration function to the threat model score, in a manner similar to that described in FIG. 5. For example, the threat analyzer 114 can use sensor input (e.g., relating to a potential malware threat), in combination with a user-provided estimate of the threat level of the potential malware threat, and a selection of a Bayesian calibration function and/or a similar function representing an estimation of the threat of malware samples, to calculate and/or estimate a threat level of the potential malware threat. Sensor input can include count values for entropy values for a file, byte values found within particular windows of the file, values associated with feature sets, and/or other data used to calculate a threat score (e.g., as described with respect to FIG. 5). In some implementations, a particular Bayesian and/or similar calibration function can be selected based on an estimated effectiveness of a threat model. For example, the threat analyzer 114 can analyze results generated from a particular threat model (e.g., can determine an error rate, and/or a similar effectiveness metric), based on user and/or system feedback on the results generated by that threat model. When a potentially malicious file is received, the threat analyzer 114 can select a particular Bayesian and/or similar calibration function, from a set of stored and/or known Bayesian and/or similar calibration functions, that can adjust a final threat score, so as to reduce and/or eliminate an error rate, and/or otherwise affect an effectiveness metric, of the threat model. In this manner, the threat analyzer 114 can improve the effectiveness of a threat model by selecting a calibration function that adjusts the final calculation of a threat score, based on an estimated effectiveness of the threat model producing the threat score.

For yet another example, any other suitable values and/or metadata associated with a file can be used both in training the threat model, and in analyzing potentially malicious sample files. For example, metadata associated with a length of the file, an author of the file, a publisher of the file, a compilation date of the file, and/or the like (e.g., as shown and described with respect to FIG. 8) can be used as input into the threat model to identify malware. Such inputs can be used in addition to other data (e.g., byte value data and/or string value data, as noted above), or can be used as an alternative to other data used to classify files. In some embodiments, for example, such metadata parameters and/or values can be grouped into different bins and/or buckets corresponding to a group of values associated with these parameters and/or ranges associated with these parameters (e.g., as shown and described with respect to FIG. 8). Metadata parameters can, for example, be extracted from each file and used to calculate informational entropy of the files. Such metadata parameters can also be used to generate classifiers, to define classifications of malware, and/or to identify potentially malicious sample files. For example, hash values derived from applying a hashing function to metadata parameters can be used as input to the threat model (e.g., as shown and described with respect to FIG. 8). Informational entropy, when using file metadata, can be calculated based on the metadata from one file, the metadata from multiple files known to be associated with a particular classification and/or sharing a similar attribute, and/or the like. Indications of the groupings that can be defined based on the metadata, can also be used as input into the threat model, e.g., when the threat model is being trained, and/or when the threat model is determining whether or not a potentially malicious sample file is malware.

Figure 9:
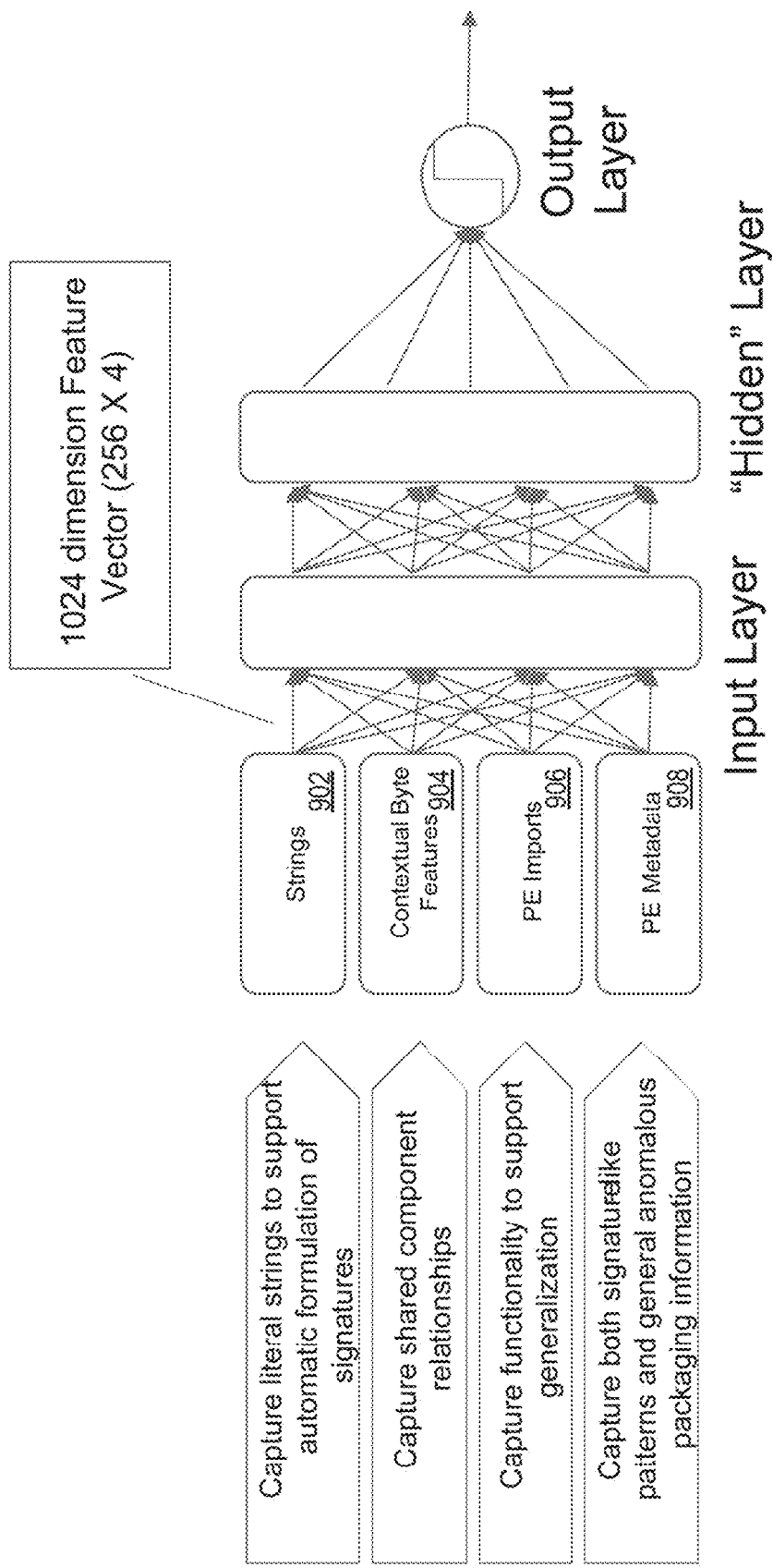
FIG. 9 is a schematic diagram illustrating an example neural network threat model, according to an embodiment.

FIG. 9 illustrates an additional sample threat model. For example, in some implementations, the threat analyzer 114 can use any of several different types of information, in combination, to make a prediction about a given potentially malicious sample file. For example, the threat model can receive, as input, at least one of: (1) a string histogram vector 902 (e.g., a one-dimensional representation of a two-dimensional histogram of strings in the binary file of the potentially malicious sample file, as described above), (2) an entropy histogram vector 904 (e.g., a one-dimensional representation of the informational entropy histogram as described in FIG. 7), (3) a PE import vector 906 (e.g., a vector including hash values of features of an API, and/or a similar library that includes an import address table representing external function calls and/or similar information), and (4) a PE metadata vector 908 (e.g., a vector including features derived from the metadata of the potentially-malicious file, as described above). Each of the input vectors can be derived from the potentially malicious sample file, and/or from data associated with the potentially malicious sample file.

For example, in some implementations, the string histogram vector 902 can be generated by hashing strings with a hash function that hashes the strings into a limited range (e.g., that hashes the strings into the range [0,16)), and by performing a calculation on the string's length (e.g., by calculating the $\log_{1.25}$ of each string length). The hash value and the log length value can be paired as a coordinate in a two-dimensional histogram, with hash values represented by the first axis and log length values represented by the second axis. After the two-dimensional histogram is generated, each row vector of the two-dimensional histogram can be concatenated to generate a finalized string histogram vector 902. In some implementations, an entropy histogram vector 904 can be generated by computing an entropy histogram (e.g., similar to FIG. 7), and by concatenating row vectors of the entropy histogram.

As another example, a PE import vector 906 can be calculated based on hashing values from an import address table. For example, after initializing an array of integers to zero, an import address table can be extracted from a binary of the potentially-malicious sample file. Tuples in the import address table that include a dynamic-link library (DLL) and an import function can be hashed into a limited range corresponding to the length of the array (e.g., if the array of integers has a length of 256, the values can be hashed into a range of [0, 255)).

As another example, a PE metadata vector 908 can be generated by extracting numerical portable executable fields from a binary of the potentially-malicious sample file (e.g., using a parsing library, such as Python's "pefile," and/or a similar mechanism). Each field name can then be stored in an array of a predetermined size (e.g., a length of 256, and/or the like). In some implementations, the field names can be hashed and added to an index of the array corresponding to the hash value. An example array is shown and described with respect to FIG. 8.

In some implementations, each input vector can be limited to 256-dimensions, and/or can be similarly limited to a predetermined dimension. Each input vector can be generated by a client device 202, and/or by a malware detection server 102 (e.g., via the informational entropy calculator 110, the threat model manager 118, and/or the threat analyzer 114). The deep neural network threat model can use any of the input vectors to determine whether or not the potentially-malicious sample file is malware (e.g., can combine each of the 256-dimension vectors into a 1024-dimension input vector, can use a portion of the 256-dimensional vectors as an input vector, and/or the like). In some implementations, aggregating feature vectors in this manner can reduce the amount of memory storage used, and the processing time required, for initiating and training a threat model (such as a deep neural network threat model), while still allowing the malware detection server 102 to train the threat model using a range of various data points. The deep neural network threat model can include a number of input nodes corresponding to the length of the input vector (e.g., can have 1024 input nodes for a 1024-dimensional input vector), can include at least one hidden layer including a similar number of nodes (e.g., can include one or more hidden layers that have 1024 nodes), and can include one output node (e.g., a sigmoid unit outputting a raw threat score for the potentially-malicious sample file).

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. A method, comprising:
   receiving a target file;
   calculating an attribute value associated with the target file, the attribute value being based on an indication of how often a combination of a string length range and a string hash value range occurs within the target file;
   calculating a probability that the target file is malicious based on the attribute value;
   communicating a threat score based on the probability, the threat score associated with at least one of a potential threat to a user, a potential threat to a device, or a potential threat to a network; and
   performing a remedial action based on the threat score.

2. The method of claim 1, wherein the calculating the probability includes calculating the probability using a trained threat model including at least one of a random forest classifier or a deep neural network.

3. The method of claim 1, wherein the remedial action includes at least one of quarantining the target file, deleting the target file, sending a notification regarding the target file, cleaning the target file, or allowing the target file to execute within a virtual container.

4. The method of claim 1, wherein the calculating the attribute value includes, for each byte window from a plurality of byte windows of the target file, determining how often a byte value in that byte window is within a byte value range.

5. The method of claim 1, wherein the calculating the probability includes calculating the probability using at least one of a rate of false positives associated with a trained threat model or a rate of false negatives associated with the trained threat model.

6. The method of claim 1, wherein the attribute value is further based on, for each byte window from a plurality of byte windows of the target file, whether an informational entropy associated with that byte window is within an informational entropy range.

7. The method of claim 1, wherein the attribute value is further based on, for each byte window from a plurality of byte windows of the target file, whether a byte standard deviation value for that byte window is within a byte standard deviation range.

8. An apparatus, comprising:
   a memory; and
   a hardware processor operatively coupled to the memory, the hardware processor configured to receive a target file, the hardware processor configured to calculate an attribute associated with the target file, the attribute based on a number of strings within the target file having a string length within a string length range,
   the hardware processor further configured to calculate, based on the attribute, a probability that the target file is malicious, and output a threat score based on the probability.

9. The apparatus of claim 8, wherein the attribute is further based on, for each byte window from a plurality of byte windows of the target file, whether a byte standard deviation value for that byte window is within a byte standard deviation range.

10. The apparatus of claim 8, wherein the hardware processor is configured to calculate the probability using a trained threat model including at least one of a random forest classifier or a deep neural network.

11. The apparatus of claim 8, wherein the hardware processor is configured to calculate the threat score based on a security indication associated with a network associated with the target file.

12. The apparatus of claim 8, wherein the hardware processor is configured to calculate the threat score using metadata associated with the target file.

13. The apparatus of claim 8, wherein the attribute is further based on, for each byte window from a plurality of byte windows of the target file, how often a byte value in that byte window is within a byte value range.

14. The apparatus of claim 8, wherein the attribute is further based on a number of strings within the target file having a string hash value within a string hash value range.

15. A non-transitory processor-readable medium storing code representing instructions to be executed by a processor, the instructions comprising code to cause the processor to:
   receive a target file;
   determine an attribute associated with the target file, the attribute based on a number of strings within the target file having a string hash value within a string hash value range;
   determine a probability that the target file is malicious based on the attribute; and
   output a threat score based on the probability.

16. The non-transitory processor-readable medium of claim 15, wherein the attribute is further based on, for each byte window from a plurality of byte windows of the target file, whether an informational entropy associated with that byte window is within an informational entropy range.

17. The non-transitory processor-readable medium of claim 15, wherein the code to cause the processor to determine the probability includes code to cause the processor to determine the probability that the target file is malicious using a trained threat model including at least one of a random forest classifier or a deep neural network classifier.

18. The non-transitory processor-readable medium of claim 15, wherein the attribute is further based on a number of strings within the target file having a string length within a string length range.

19. The non-transitory processor-readable medium of claim 15, wherein the code to cause the processor to determine the probability includes code to cause the processor to determine the probability that the target file is malicious using metadata associated with the target file.

20. The non-transitory processor-readable medium of claim 15, wherein the target file is a Portable Executable (PE) file including PE fields, the code to cause the processor to determine the probability includes code to cause the processor to determine the probability based on information identified from the PE fields of the PE file.

21. The non-transitory processor-readable medium of claim 15, wherein the attribute is further based on, for each byte window from a plurality of byte windows of the target file, determining (1) how often a byte value in that byte window is within a byte value range and (2) whether an informational entropy associated with that byte window is within an informational entropy range.

* * * * *